(12) United States Patent
Swope et al.

(10) Patent No.: US 12,501,881 B2
(45) Date of Patent: Dec. 23, 2025

(54) SYSTEM AND METHOD FOR IDENTIFYING, TRACKING, AND MONITORING BEHAVIORS OF LABORATORY ANIMALS WITHIN AN ANIMAL CAGE

(71) Applicant: RapID Lab, Inc., San Francisco, CA (US)

(72) Inventors: Bretton Mark Swope, San Francisco, CA (US); Alexander Spindel, San Francisco, CA (US); Kenneth Beres, San Francisco, CA (US)

(73) Assignee: RapID Lab, Inc., San Francisco, CA (US)

( * ) Notice: Subject to any disclaimer, the term of this patent is extended or adjusted under 35 U.S.C. 154(b) by 0 days.

(21) Appl. No.: 18/979,471

(22) Filed: Dec. 12, 2024

(65) Prior Publication Data

US 2025/0176496 A1 Jun. 5, 2025

Related U.S. Application Data

(63) Continuation-in-part of application No. 18/383,437, filed on Oct. 24, 2023, now Pat. No. 12,295,347,
(Continued)

(51) Int. Cl.
*A01K 11/00* (2006.01)

(52) U.S. Cl.
CPC .......... *A01K 11/004* (2013.01); *A01K 11/002* (2013.01)

(58) Field of Classification Search
CPC .... A01K 11/004; A01K 11/002; A01K 1/031; A01K 29/005; A01K 11/001;
(Continued)

(56) References Cited

U.S. PATENT DOCUMENTS

| 4,448,150 A | 5/1984 | Catsimpoolas |
| 4,617,876 A | 10/1986 | Hayes |

(Continued)

OTHER PUBLICATIONS

Dauchy et al. "Vivarium lighting as an important extrinsic factor influencing animal-based research." Journal of the American Association for Laboratory Animal Science 62.1 (2023): 3-25. Jan. 2023 (Jan. 2023) Retrieved on Feb. 7, 2025 (Feb. 7, 2025) from entire document.

(Continued)

*Primary Examiner* — Trinh T Nguyen
(74) *Attorney, Agent, or Firm* — Run8 Patent Group, LLC; Peter Miller; Marissa Kohrman

(57) ABSTRACT

A method for animal identification and tracking includes, during a dark cycle: illuminating an interior of an animal cage with light outside of a visible light range; and capturing a first image of the interior of the animal cage. The method also includes: detecting a first identification tag in the first image; extracting a first set of tag features from the first image; identifying a first animal identifier of a first animal, tagged with the first identification tag, based on the first set of tag features; interpreting a first animal position of the first animal occupying the animal cage based on the first image; appending a cage log with the first animal identifier, a first timestamp corresponding to a time of capture of the first image, and the first animal position.

17 Claims, 5 Drawing Sheets

Related U.S. Application Data which is a continuation of application No. 17/884,504, filed on Aug. 9, 2022, now Pat. No. 11,832,586, which is a continuation-in-part of application No. 17/300,310, filed on Aug. 9, 2021, now Pat. No. 11,937,571.

(60) Provisional application No. 63/609,251, filed on Dec. 12, 2023.

(58) Field of Classification Search
CPC ...... G06V 10/764; G06V 40/20; G06V 20/46; G06V 40/10; G06T 7/246; G06T 7/73
See application file for complete search history.

(56) References Cited

U.S. PATENT DOCUMENTS

| | | | |
|---|---|---|---|
| 8,704,668 B1* | 4/2014 | Darrell | A01K 29/005 340/573.3 |
| 2003/0051676 A1 | 3/2003 | Rivard | |
| 2003/0083822 A2* | 5/2003 | Brunner | G16B 40/30 702/19 |
| 2008/0152192 A1 | 6/2008 | Zhu et al. | |
| 2013/0006065 A1 | 1/2013 | Yanai et al. | |
| 2015/0146939 A1 | 5/2015 | Datta et al. | |
| 2015/0223433 A1* | 8/2015 | Navawongse | G06V 40/20 119/421 |
| 2017/0124264 A1 | 5/2017 | Jordan et al. | |
| 2017/0172104 A1 | 6/2017 | Swope et al. | |
| 2019/0037801 A1* | 2/2019 | Betts-Lacroix | A61B 5/7246 |
| 2019/0037811 A1* | 2/2019 | Betts-Lacroix | A01K 1/00 |
| 2019/0183091 A1 | 6/2019 | Betts-LaCroix et al. | |
| 2020/0383299 A1* | 12/2020 | Bermudez Contreras | G06V 40/10 |
| 2021/0076643 A1 | 3/2021 | Persaud | |
| 2021/0298272 A1 | 9/2021 | Sarzen et al. | |

OTHER PUBLICATIONS

International Search Report and Written Opinion for International Patent Application No. PCT/US24/59902 mailed on Feb. 13, 2025; 16 pages.

Pereira et al. "Fast animal pose estimation using deep neural networks." Nature methods 16.1 (2020): 117-125. Retrieved on Feb. 7, 2025 (Feb. 7, 2025) from entire document.

* cited by examiner

SYSTEM AND METHOD FOR IDENTIFYING, TRACKING, AND MONITORING BEHAVIORS OF LABORATORY ANIMALS WITHIN AN ANIMAL CAGE

CROSS-REFERENCE TO RELATED APPLICATIONS

This application claims the benefit of U.S. Provisional Application No. 63/609,251, filed on 12 Dec. 2023, which is incorporated in its entirety by this reference.

This Application is a continuation-in-part of U.S. patent application Ser. No. 18/383,437, filed on 24 Oct. 2023, which is a continuation of U.S. patent application Ser. No. 17/884,504, filed on 9 Aug. 2022, which is a continuation-in-part of U.S. patent application Ser. No. 17/300,310, filed on 9 Aug. 2021, each of which is incorporated in its entirety by this reference.

TECHNICAL FIELD

This invention relates generally to the field of animal tracking and identification and, more specifically, to a new and useful animal identification and tracking method in the field of animal identification and tracking.

DESCRIPTION OF THE EMBODIMENTS

Figure 1:
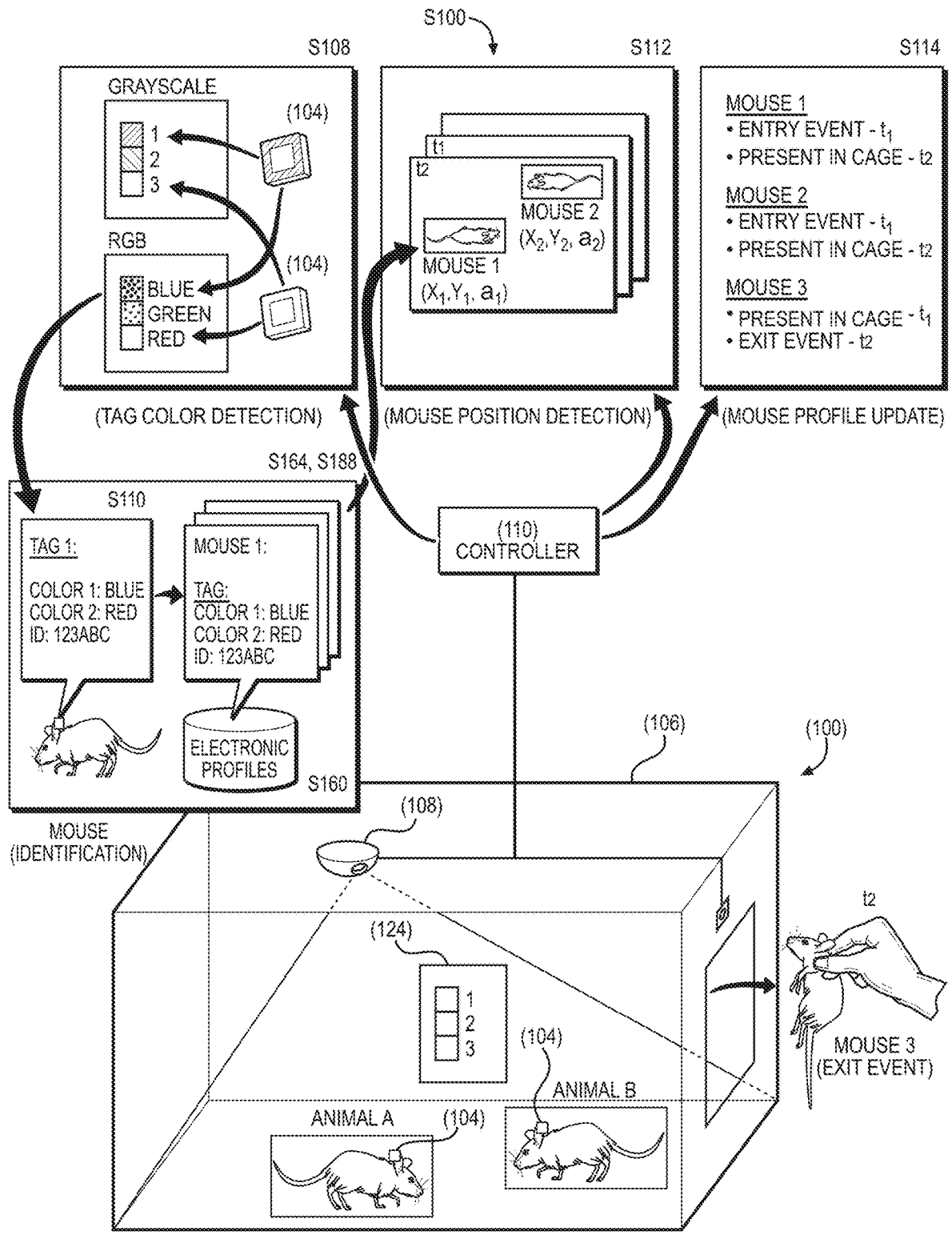
FIG. 1 is a flowchart representation of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe, the invention described herein can include any and all permutations of these variations, configurations, implementations, example implementations, and examples.

1. SYSTEM

As shown in FIGS. 3A, 3B, 3C, 3D, 4, and 5, a system 100 for animal identification and tracking includes: an optical emitter 102 configured to emit infrared light toward an interior volume of an animal cage 106 occupied by an animal population; a first identification tag 104 configured to install on a first ear of a first animal in a population of animals occupying the animal cage 106 and including a first outer face 114 configured to reflect infrared light in a first pattern; a second identification tag 104 configured to install on a second ear of a second animal in the population of animals occupying the animal cage 106 and including a second outer face configured to reflect infrared light in a second pattern different from the first pattern; an optical sensor 108 configured to capture an infrared image of the interior volume of the animal cage 106; and a controller 110 configured to detect a first position of the first animal occupying the animal cage 106 at a first time based on presence of the first pattern in the infrared image and detect a second position of the second animal occupying the animal cage 106 at the first time based on presence of the second pattern in the infrared image.

2. METHOD

Figure 2:
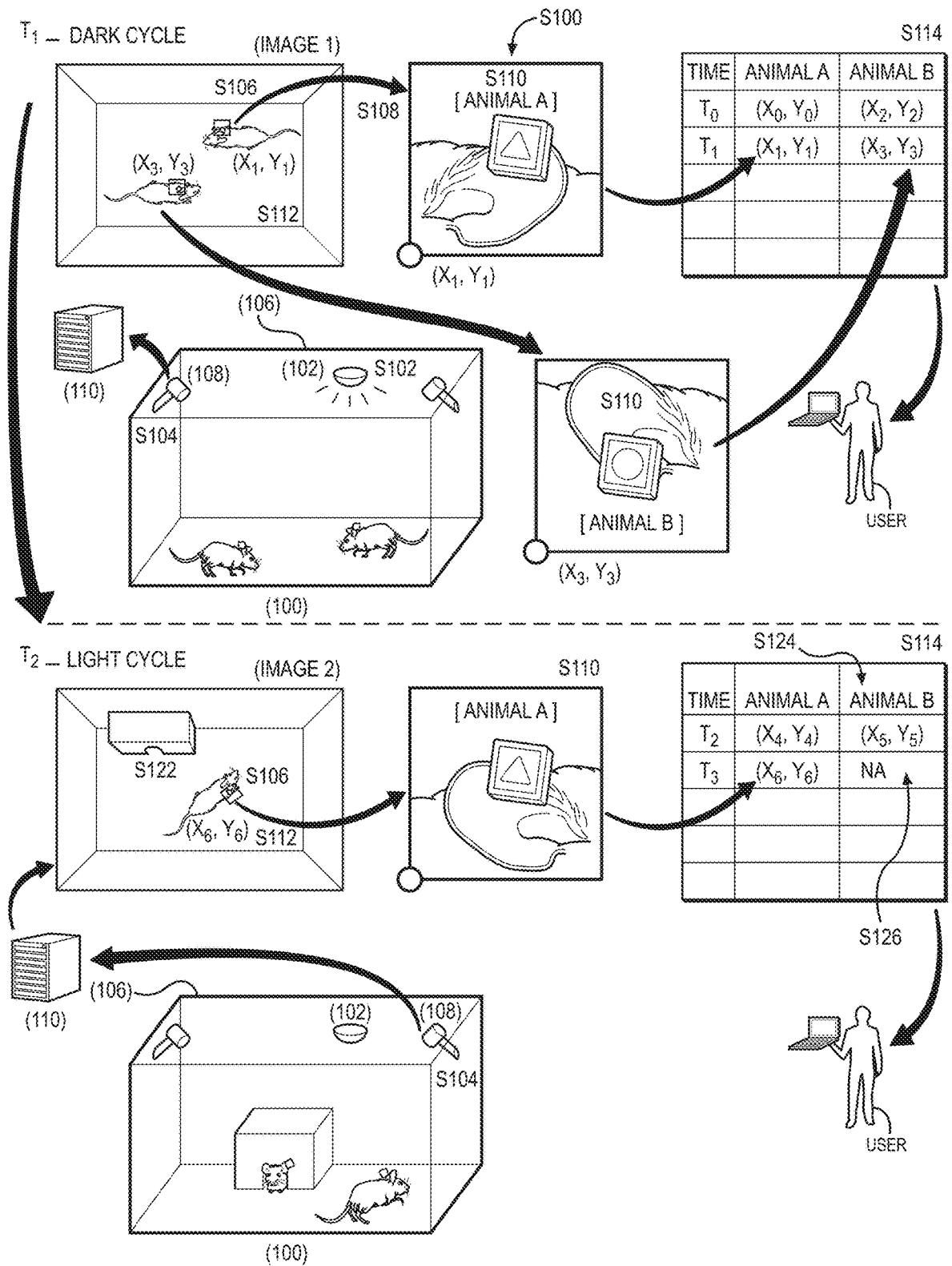
FIG. 2 is a flowchart representation of one variation of the method.
Figure 3A:
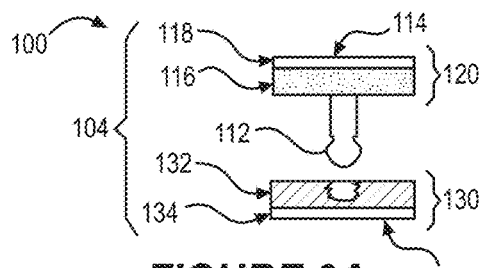
FIGS. 3A, 3B, 3C, and 3D are schematic representations of an animal tracking and identification system.
Figure 3B:
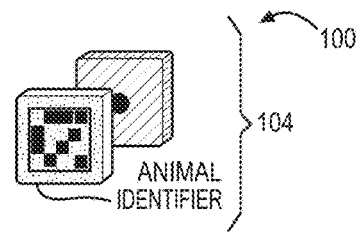
Figure 3C:
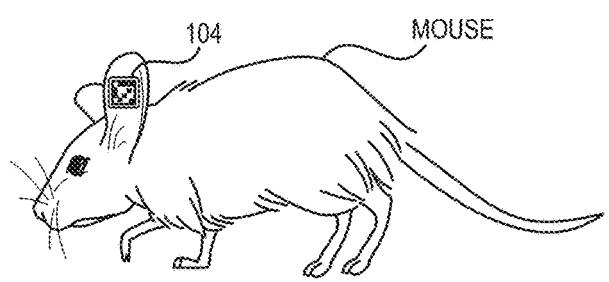
Figure 3D:
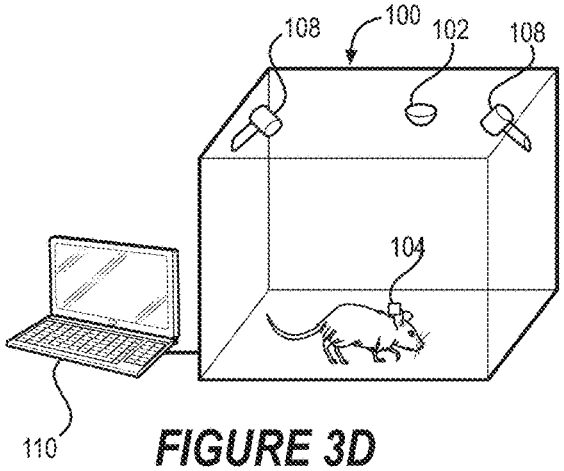
Figure 4:
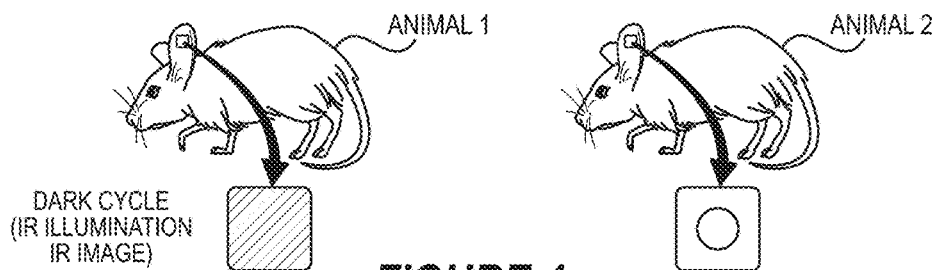
FIG. 4 is a schematic representation of one variation of the animal tracking and identification system.
Figure 6:
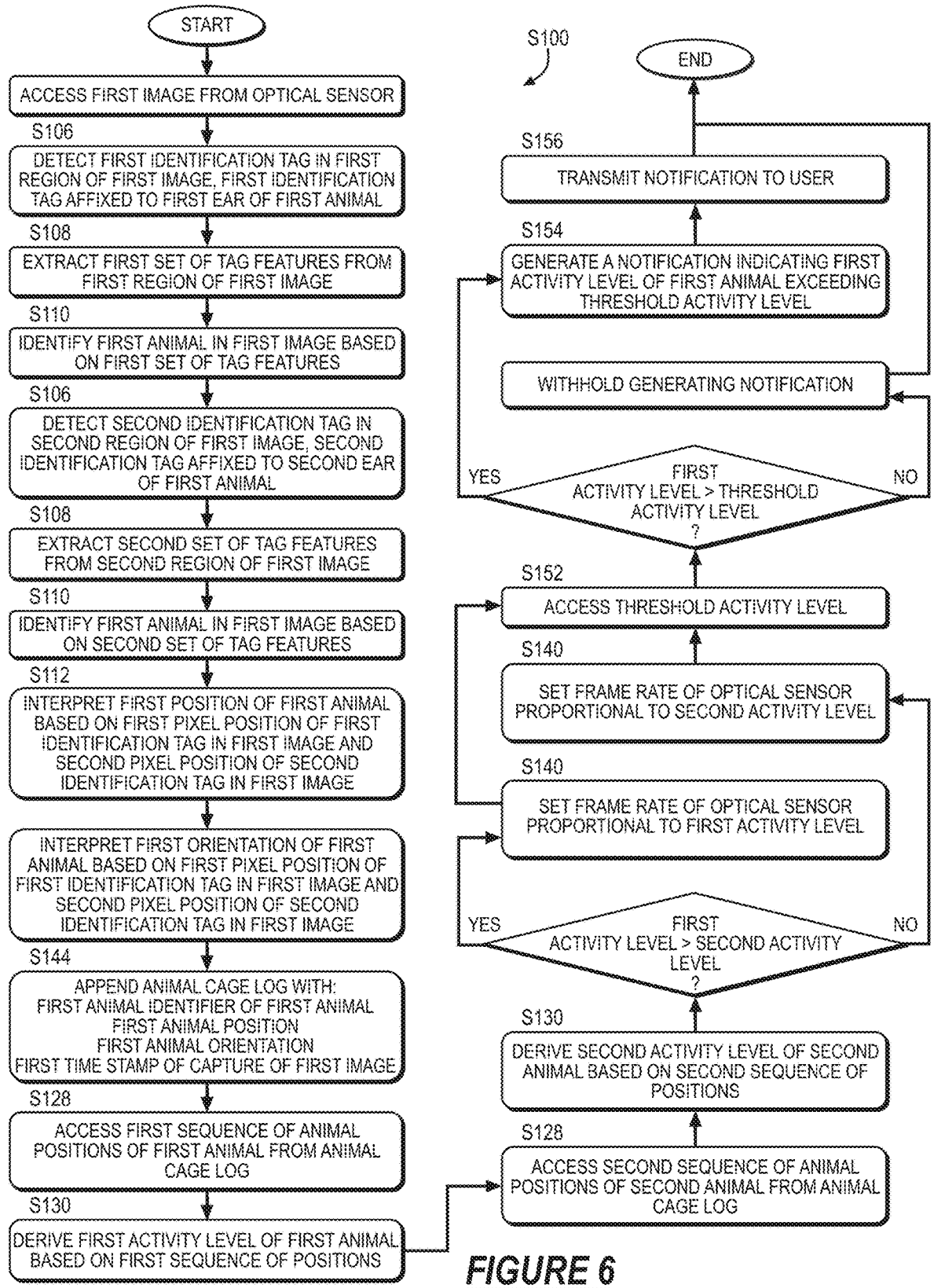
FIG. 6 is a flowchart representation of one variation of the method.

As shown in FIGS. 1, 2, and 6, a method S100 for animal identification and tracking includes, during a dark cycle: illuminating an interior volume of an animal cage, occupied by a population of animals, with light outside of a visible light range in Block S102; and, at a first time, capturing a first image of the interior volume of the animal cage in Block S104.

The method S100 also includes: detecting a first identification tag 104 in a first region of the first image in Block S106; extracting a first set of tag features from the first region of the first image in Block S108; identifying a first animal identifier of a first animal, tagged with the first identification tag, based on the first set of tag features in Block S110; interpreting a first animal position of the first animal occupying the animal cage based on a first pixel position of the first identification tag in the first image in Block S112; and appending an animal cage log with the first animal identifier of the first animal, a first timestamp corresponding to the first time, and the first animal position of the first animal in Block S114.

The method S100 further includes: during a light cycle, capturing a second image of the interior volume of the animal cage at a second time succeeding the first time in Block S104; detecting a second identification tag in a second region of the second image in Block S106; extracting a second set of tag features from the second region of the second image in Block S108; identifying a second animal identifier of a second animal, tagged with the second identification tag, based on the first set of tag features in Block S110; interpreting a second animal position of the second animal occupying the animal cage based on a second pixel position of the second identification tag in the second image in Block S112; and appending the animal cage log with the second animal identifier of the second animal, a second timestamp corresponding to the second time, and the second animal position of the second animal in Block S114.

2.1 Variation: Detecting First Animal

One variation of the method S100 further includes: during a light cycle, capturing a second image of the interior volume of the animal cage at a second time succeeding the first time in Block S104; detecting the first identification tag in a second region of the second image in Block S106; extracting a second set of tag features from the second region of the second image in Block S108; identifying the first animal identifier of a second animal based on the first set of tag features in Block S110; interpreting a second animal position of the first animal based on a second pixel position of the second identification tag in the second image in Block S112; and appending the animal cage log with the first animal identifier of the first animal, a second timestamp corresponding to the second time, and the second animal position of the first animal in Block S114.

2.2 Variation: Detecting Animal Absence

Another variation of the method S100 includes: at a first time, accessing a first image captured by an optical sensor facing an interior volume of an animal cage (herein also referred to as the cage) transiently occupied by an animal population in Block S104; detecting a first set of tag features (e.g., a QR code, a color, a pattern) of a first identification tag affixed to a first animal, in the animal population, in the first image in Block S106; accessing a population of electronic profiles associated with the animal population, each electronic profile, in the population of electronic profiles, defining a set of tag features of an identification tag affixed to a corresponding animal in the animal population in Block S160; in response to a first electronic profile, in the population of electronic profiles, corresponding to the first animal and including the first set of tag features, interpreting presence of the first animal in the animal cage at the first time in Block S110; generating a first data packet including a first value representing presence of the first animal within the animal cage and a first timestamp corresponding to the first time in Block S164; and writing the first data packet to the first electronic profile in Block S118.

This variation of the method S100 also includes: at a second time succeeding the first time, accessing a second image captured by the optical sensor in Block S102; extracting a second set of tag features in the second image in Block S108; and, in response to the similarity score-representing similarity of the second set of tag features and the first set of tag features-falling below the score threshold, detecting absence of the first animal from the animal cage at the second time and interpreting an exit event of the first animal exiting the animal cage at approximately the second time in Block S122; generating a second data packet including a second value representing absence of the first animal from the animal cage, the exit event, and a second timestamp corresponding to the second time in Block S164; and writing the second data packet to the first electronic profile in Block S118.

This variation of the method S100 further includes: at a third time succeeding the second time, accessing a third image captured by the optical sensor in Block S104; extracting a third set of tag features in the third image in Block S108; in response to the third set of tag features corresponding to the first set of tag features associated with the first electronic profile of the first animal, interpreting presence of the first animal in the animal cage at the third time and interpreting an entrance event of the first animal into the animal cage at approximately the third time in Block S112; generating a third data packet including a set of values representing presence of the first animal within the animal cage, the entrance event, and a timestamp corresponding to the third time in Block S164; and writing the third data packet to the first electronic profile in Block S118.

3. APPLICATIONS

Generally, the method S100 can be executed by a computer system (e.g., a computer network, a remote computer system, a local or remote server) and/or by a local controller 110—interfacing with one or more optical sensors 108 arranged on and/or within an animal cage 106—to: capture an image feed of an interior of the animal cage 106 occupied by a population of lab animals (e.g., mice, rats, rabbits); detect one or more identification tags 104—affixed to animals transiently occupying the animal cage 106—in an image in the image feed; extract a set of tag features—such as including a QR code, a particular color, a particular pattern, etc.—of each identification tag 104 depicted in the image; and uniquely identify a particular animal present in the animal cage 106 based on detection of a unique set of tag features-associated with this particular animal—in the image. Additionally or alternatively, the computer system and/or controller 110 can interpret absence of the particular animal from the animal cage 106 responsive to omission of this unique set of tag features in an image in the image feed.

The computer system can then therefore: interpret presence and/or absence of each animal, in the animal population, within the animal cage 106 based on detection of unique combinations of tag features of identification tags 104 (e.g., an identification tag affixed to an animal) in images in the image feed; and assemble a timeseries of occupancy data-representing presence and/or absence of each animal, in the animal population, within the animal cage 106 over time—for the animal cage 106 (hereinafter a "cage") based on timestamps associated with each image in the image feed. The computer system can then: store this timeseries occupancy data in a database associated with a research study affiliated with the animal population; and—for each individual animal in the animal population-link timeseries occupancy data for this particular animal to a corresponding electronic profile of the animal. The computer system can therefore automatically track quantities and/or identities of animals present in the cage 106 over time and record this data in the database, such as for review by a researcher associated with the research study, thereby minimizing resources allocated by the researcher to manually count and/or identify unique animals present within the cage 106 throughout a duration of the research study.

Furthermore, responsive to identification of a tag-linked to an animal—in an image of the cage 106 at a particular time, the computer system can derive a position (e.g., pixel position within an image, a cage position within the cage) of the animal at this particular time. The computer system can process successive images—in the image feed captured by the optical sensor(s)—over time to automatically derive and record a timeseries of positions of this animal in the cage 106. The computer system can concurrently execute this process to derive and record timeseries of positions of multiple animals in the cage 106 based on multiple corresponding tags detected in these images. A researcher and/or the computer system may then interpret instances of specific or target events or animal behaviors within the cage 106 based on timeseries of positions.

For example, the computer system can interpret: an exit event-corresponding to removal of the animal from the cage 106—in response to detecting the animal proximal a cage door in a first image captured at a first time and subsequently detecting absence of the animal from the cage 106 at a second time immediately succeeding the first time based on a second image (e.g., captured at the second time); an entry event-corresponding to placement of the animal within the cage 106—in response to detecting absence of the animal from the cage 106 at a first time based on a first image (e.g., captured at the first time) and subsequently detecting the animal proximal the cage door in a second image captured at a second time immediately succeeding the first time; an "active" event—corresponding to a relatively high activity level exhibited by the animal—in response to movement of the animal between various positions within the cage 106 across subsequent images captured over a particular time period; a "sleep" event—corresponding to inactivity and/or sleeping of the animal—in response to detecting absence of any movement of the animal across subsequent images captured over a particular time period; etc.

Therefore, based on multiple images (e.g., two or more images) captured in succession, the computer system can: detect presence or absence of the animal in the cage 106 at various times; track movement of the animal within the cage 106; interpret entry or exit events of the animal to and from the cage 106; and interpret various behaviors—such as eating, sleeping, grooming, scratching, and/or rearing—of the animal. The computer system can then automatically record these data for this animal (e.g., in a cage log, in the electronic profile of the animal) to minimize resources—such as manual observation and/or recording by a researcher over extended periods of time-allocated to detecting and tracking these data.

3.1 Inferring Animal Health Status from Motion Data

Furthermore, the computer system can leverage detection of the animal in the image feed to characterize a set of health indicators—such as including activity level, social activity level, animal size, etc.—of the animal over time. For example, the computer system can: detect a sequence of locations of a particular animal within the cage 106 based on features extracted from images in the image feed; detect changes in location of the animal within the cage 106 based on the sequence of locations; characterize movement speed and/or movement frequency of the animal within the cage 106; and, based on the movement speed and/or movement frequency of the animal, infer an activity level of the animal within the cage. Furthermore, the computer system can: identify changes in appearance (e.g., size, fur cover) of the animal over time based on the feed of images; and, based on the activity level and/or appearance of the animal, infer a health status of the animal.

Therefore, the computer system can: detect changes in the health status of the animal over time based on changes in health indicators derived for the animal over time; and, in response to detecting a decline in the health status, notify the user of the declining health of the animal. The computer system can therefore: derive insights related to animal health, thereby reducing effort and/or time dedicated by researchers manually observing animals and/or performing manual health examinations, while alerting researchers of changes in animal health requiring immediate investigation; and/or derive insights related to changes in health indicators of animals-which may correlate to effectiveness of a particular therapeutic and/or to results of a research study—by detecting certain trends in timeseries of health indicator data (e.g., recorded in the animal cage log, recorded in the electronic profile of the animal).

3.2 Animal Cage Log

Generally, the method S100 can be executed by the computer system to populate and maintain an animal cage log and/or a digital database including the population of electronic profiles of the population of lab animals. For example, each electronic profile, in the population of electronic profiles, can include: a timeseries of occupancy data representing presence or absence of the animal in the cage 106; a timeseries of positions of the animal; a timeseries of event data representing timestamped entry and exit events; and a timeseries of indicator data including timestamped values of health indicators (e.g., activity level, animal size).

3.3 Continuous Light & Dark Cycle Monitoring

In one implementation, in order to monitor animals in the cage 106 continuously during light (e.g., daytime) and dark (e.g., nighttime) cycles, the system 100 for animal identification and tracking includes: identification tags 104 that include infrared-reflective elements; an infrared emitter 102, which illuminates the cage 106 with infrared light outside of a spectrum of light that is visible to animals in the cage 106; and an optical sensor 108—such as an infrared camera-configured to capture infrared images. For example, the optical emitter 102 can illuminate the cage 106 with one wavelength of infrared light and the identification tags 104 exhibit infrared-reflective elements that reflect (or absorb) different patterns of infrared light—of the single wavelength—such that these identification tags 104 are distinguishable in the images captured by the optical sensor 108 given the resolution of the optical sensor 108 and position of the optical sensor 108 on (or near) the cage 106.

In this example, an identification tag 104 can include a panel 116 (e.g., an aluminum plate) with an outer face 114 coated with a layer of amorphous carbon or graphite via chemical vapor deposition ("CVD") or sputtering, the outer face 114 laser—or chemically-etched to selectively remove regions of amorphous carbon or graphite to form a unique pattern of infrared-reflective aluminum and infrared-absorptive carbon or graphite regions. The identification tag 104 can also include: a tag base with a rim overmolded (e.g., in nylon) around the panel 116 leaving the outer face 114 of the panel 116 exposed; a barb 112 extending rearward from the tag base and configured to pierce an ear of an animal; and a tag backing 132 configured to engage the barb 112 to retain the identification tag 104 on ear of the animal.

Therefore, the method S100 enables detection of multiple identification tags 104 on multiple animals in the cage 106. More specifically, the computer system can direct an optical emitter 102 to illuminate the cage 106 with infrared light, such as infrared light characterized by a single wavelength. When the cage 106 is thus illuminated by infrared light, the identification tags 104 exhibit different patterns of infrared-reflective and infrared-absorptive materials. The computer system can then automatically detect these infrared patterns in an image captured by an optical sensor 108 and identify each animal—and the location of each animal in the cage 106 at the time the image was captured-based on these infrared patterns.

The method S100 is described as a method for identification and tracking of mice. However, the method S100 can also be executed to track other laboratory animals such as rats, ferrets, rabbits, pigs, etc. Furthermore, the method S100 is described as a method for identification and tracking of mice in a cage 106. However, the method S100 can also be executed to identify and track mice in another confined environment, such as a maze, a crate, etc.

4. SYSTEM

Generally, a system 100 for animal identification and tracking includes: an optical emitter 102 configured to emit infrared light toward an interior volume of an animal cage 106 occupied by a population of animals; a first identification tag 104 configured to install on a first ear of a first animal in the population of animals occupying the animal cage 106 and including a first outer face 114 configured to reflect infrared light in a first pattern; a second identification tag 104 configured to install on a second ear of a second animal in the population of animals occupying the animal cage 106 and including a second outer face configured to reflect infrared light in a second pattern different from the first pattern; an optical sensor 108 configured to capture an infrared image of the interior volume of the animal cage 106; and a controller 110 configured to detect a first position of the first animal occupying the animal cage 106 at a first time based on presence of the first pattern in the infrared image and detect a second position of the second animal occupying the animal cage 106 at the first time based on presence of the second pattern in the infrared image. Therefore, the system 100 can enable precise and non-invasive identification and tracking of individual animals within a cage 106 based on animal identification tags 104 with unique colors and patterns distinguishable under both visible and infrared light.

4.1 Identification Tags

Generally, the controller 110 can detect an identification tag 104 (hereinafter a "tag")—affixed to an animal located within the cage 106—in images captured by the optical sensor 108. In one example, each identification tag 104 can be configured to piece and affix to an ear of an animal.

In particular, each identification tag 104 can define a unique set of tag features associated with a particular animal in the animal population. In particular, each identification tag 104 can define a unique combination of optical features—such as color(s), pattern(s), anti-glare coating(s), QR code(s), etc.—that can be associated with a particular animal, in a population of lab animals, thereby enabling identification of this particular animal in the cage 106 based on detection of this unique combination of features in an image captured by the optical sensor 108. For example, at a start of a research period involving an animal population, a user (e.g., researcher) may affix a first tag-characterized by a first set of tag features—to a first animal in the animal population. Then, the controller 110 can associate a unique combination of tag features with the animal by: accessing the first set of tag features; and populating an electronic profile affiliated with the first animal with the first set of tag features. For example, a user may manually populate an electronic profile generated for the animal with the first set of tag features. In another example, the controller 110 can: extract the first set of tag features from an image captured by the optical sensor 108; and automatically populate the electronic profile with the first set of tag features.

In one implementation, each identification tag 104 can include an animal identifier arranged on the tag base 120 and/or backing plate 130 of the identification tag 104. For example, the identification tag 104 can include a two-dimensional or a three-dimensional barcode, a QR code, and/or a geometric pattern printed or etched on the identification tag 104. The controller 110 can then store this animal identifier in an electronic profile, in a population of electronic profiles, of an animal affiliated with the identification tag 104, thereby enabling identification of this animal based on detection of the animal identifier in images captured by the optical sensor 108.

4.1.1 Multi-Feature Identification Tags

Additionally or alternatively, the identification tag 104 can define a surface of a particular color. For example, the tag base 120 and the backing plate 130 of the identification tag 104 can one or multiple colors distinguishable when illuminated with visible light. For example, a first tag can define a tag base 120 of a first color and a backing plate 130 of a second color. In this example, the controller 110 can detect presence of the first tag—and therefore a corresponding animal associated with the first tag—in an image captured by the optical sensor 108 with high confidence based on detection of both the first and second colors of the front and back surfaces, respectively.

Furthermore, by including multiple tag features in a single tag, the identification tag 104 can be configured to represent multiple types of identifying information of the animal. For example, the identification tag 104 can define: a tag base 120 of a first color associated with a first cage 106, in a set of cages, occupied by the animal; a backing plate 130 of a second color indicating whether the animal belongs to a control group or a treatment group of animals in a scientific experiment; an identifier (e.g., a QR code) arranged on the tag base 120 and/or backing plate 130 and linked to a first electronic profile affiliated with the animal and storing information and/or historical data collected for the animal.

4.1.2 Anti-Glare & Non-Toxic Materials

In one implementation, the identification tag 104 can define one or more surfaces-defining a set of tag features (e.g., a QR code, a color, a pattern)—configured to reduce glare on these surfaces, thereby enhancing visibility and/or detectability of the set of tag features in the images captured by the optical sensor 108. Therefore, by including anti-glare surface finish on the outer surfaces of an identification tag 104, the system 100 can enable the controller 110 to: detect the set of tag features of the identification tag 104 with greater accuracy due to reduced glare (e.g., scattered, or specular reflections) in the image; and leverage detection of the set of tag features to identify a particular animal-associated with this set of tag features—in the image with increased confidence.

For example, the identification tag 104 can define a textured surface finish (e.g., an anti-glare textured surface) configured to reduce reflectivity of the identification tag 104 in images captured by the optical sensor 108. For example, the identification tag 104 can include a textured anti-glare surface finish created by abrasive blasting a surface of the identification tag 104 (e.g., propelling an abrasive media against the surface of the identification tag 104); and anodizing or electroplating the surface of the identification tag 104 to form a protective layer (e.g., an oxide layer or a metal layer) on the surface of the identification tag 104. In another example, the identification tag 104 can include a textured anti-glare surface finish created by: chemically micro-etching a surface of the identification tag 104 to reduce glossiness of the surface; and anodizing the surface of the identification tag 104 to form a protective oxide layer on the surface of the identification tag 104.

In another implementation, the identification tag 104 can include a surface coating—such as deposited over the front plate and/or the back plate of the identification tag 104—configured to reduce reflectivity of surfaces of the identification tag 104. In one example, the identification tag 104 can include an anti-glare surface coating applied to surface of the identification tag 104 and configured to enhance visibility of the set of tag features—such as including an animal identifier and/or a tag color of the identification tag 104—in images captured by the optical sensor 108 by reducing reflectivity of these surfaces.

In yet another implementation, the identification tag 104 can be formed of non-toxic materials. For example, the identification tag 104 can include a coating formed of translucent food-grade polymer (e.g., polycarbonate or polyethylene terephthalate), which enables the system 100 to illuminate the tag with visible and infrared light and to detect visible and infrared features of the tag while shielding animals from contact with or consumption of other materials in the tag.

4.1.3 Infrared-Reflective and Absorptive Materials

In one implementation, the identification tag 104 includes a tag base 120 defining: an inner face; an outer face 114 opposite the inner face and including an infrared-reflective plate 116 and an infrared-absorptive coating, the infrared-absorptive coating applied over the infrared-reflective plate 116 and etched in an infrared-reflective pattern; and a barb 112 extending rearward from the inner face. The identification tag 104 also includes a backing plate configured to receive and retain the barb 112. For example, the identification tag 104 includes: a tag base 120 formed of polycarbonate; an infrared-reflective plate 116, The infrared-reflective plate 116 can include a pseudo-unique pattern: of a coating or substrate (e.g., a titanium dioxide) that reflects a target wavelength infrared light; an infrared-absorptive coating or substrate (e.g., a polymer matrix including iron oxide pigments) that absorbs the target wavelength infrared light.

Accordingly, by including a pseudo-unique pattern of both infrared-reflective and infrared-absorptive materials on the outer face of the identification tag 104, the identification tag 104 can be uniquely identified—in a population of similar identification tags 104—within an infrared image captured during illumination of the animal cage with a single target wavelength infrared light, such as during a dark cycle (i.e., at night when the animal cage is not illuminated with visible light).

Additionally or alternatively, an outer face of the identification tag 104 can include an infrared-reflective base and a visible light-reflective coating, or vice versa. By including both infrared-reflective and infrared-absorptive materials on the outer face of the identification tag 104, the system 100 enables the optical sensor 108 to detect the identification tags 104 both during the dark cycle (e.g., in the absence of visible light) and during the light cycle (e.g., in the presence of visible light).

Additionally or alternatively, the outer face of the identification tag 104 can include dyes and/or pigments (e.g., infrared-reflective, infrared-absorptive, visible light-reflective, visible light-absorptive) embedded in the base material in a specific pattern that is discernible by the system 100 when illuminated with visible and/or infrared light. For example, the tag base 120 can include: a panel 116 including an aluminum plate coated with a pattern of infrared-reflective and/or infrared-absorptive materials; and an injection molded carrier of a colored polymer—of a color unique within a population of (e.g., 10) identification tags—molded around the aluminum plate. The system can thus uniquely identify the tag based on: a color of the injection molded carrier when illuminated with visible light (e.g., during a light cycle); and a pattern of infrared-reflective surfaces on the tag when illuminated with infrared light (e.g., during a dark cycle).

Additionally or alternatively, the outer face of the identification tag 104 can define one or more distinct textures embossed in a pattern, each texture characterized by distinct infrared and/or visible light-reflective properties.

In one implementation, the first identification tag 104 further includes the third backing plate 130 defining: a second inner face; and a second outer face 136 arranged opposite the second inner face and including a third infrared-reflective base 132 and a third infrared-absorptive coating 134, the third infrared-absorptive coating 134 applied over the third infrared-reflective base 142 and etched in a third infrared-reflective pattern. For example, the first identification tag 104 can embed in an ear of the animal with the barb 112 piercing the ear, the first outer face 114 arranged on the first side of the ear facing outward, and the third outer face 136 arranged on the second side of the ear facing outward.

4.1.4 Infrared-Patterned Outer Face & Visible Color Rim

Figure 5:
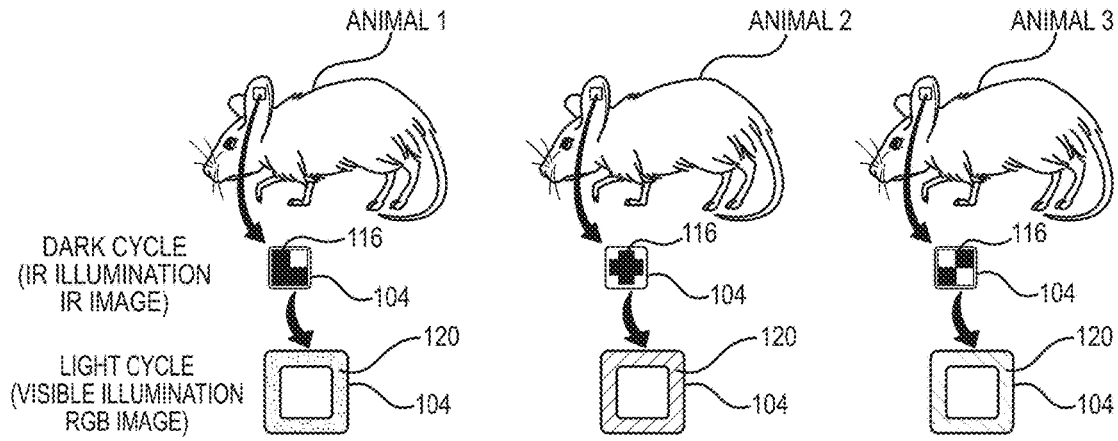
FIG. 5 is a schematic representation of one variation of the animal tracking and identification system.

In one implementation, as shown in FIG. 5, the identification tag 104 includes a tag base 120: molded around the panel; defining a rim encasing an edge of the panel; and characterized by a visible color, such as green, blue, orange, red, or brown. For example, the tag base 120 can be formed of polycarbonate (or another polymer) dyed with a visible color dye or doped with visible color pigment. In this implementation, the panel of the identification tag 104 can include the outer face 114 depicting a pattern of infrared-reflective and infrared-absorptive regions. For example, the identification tag 104 can include the panel formed of aluminum with an outer face 114 coated with a layer of amorphous carbon or graphite, the outer face 114 laser—or chemically-etched to selectively remove regions of amorphous carbon or graphite to form a unique pattern of infrared-reflective aluminum and infrared-absorptive carbon or graphite regions.

More specifically, the pattern of infrared-reflective and infrared-absorptive regions can include infrared-reflective and infrared-absorptive pixels arranged in a grid (e.g., two-by-two pixel grid, three-by-three pixel grid, four-by-four pixel grid). In one example, a first pattern—depicted on a first identification tag 104—can include one infrared-reflective pixel and three infrared-absorptive pixels arranged in a square grid of four pixels. In another example, a second pattern—depicted on a second identification tag 104—can include two infrared-reflective pixels and two-infrared absorptive pixels, arranged diagonally, in a square grid of four pixels. In yet another example, a third pattern —depicted on a third identification tag 104—can include four infrared-reflective pixels arranged in each corner of a square grid of 16 pixels, with remaining pixels in the grid including infrared-absorptive pixels. In this implementation, each pattern can include a unique combination of infrared-reflective and infrared-absorptive pixels arranged in the grid. In this implementation, a pixel size of the pixels in each pattern depicted on an identification tag 104 is proportional to a resolution of the optical sensor 108 at a distance (e.g., maximum distance) between the optical sensor 108 and the identification tag 104 in the cage 106. Accordingly, the computer system can identify each pattern depicted on the identification tag 104 in the images captured by the optical sensor 108 under infrared illumination.

Accordingly, each animal identifier can include a combination of a visible color of the tag base 120 (e.g., rim encasing an edge of the panel) and a pattern of infrared-reflective and infrared-absorptive regions (e.g., pixels) depicted on the outer face 114 of the panel. Therefore, the computer system can identify an animal based on a visible color of the rim of the identification tag 104 during the light cycle and identify the animal based on the pattern of infrared-reflective and infrared-absorptive regions (e.g., pixels) depicted on the outer face 114 of the identification tag 104 during the dark cycle.

Figure 7:
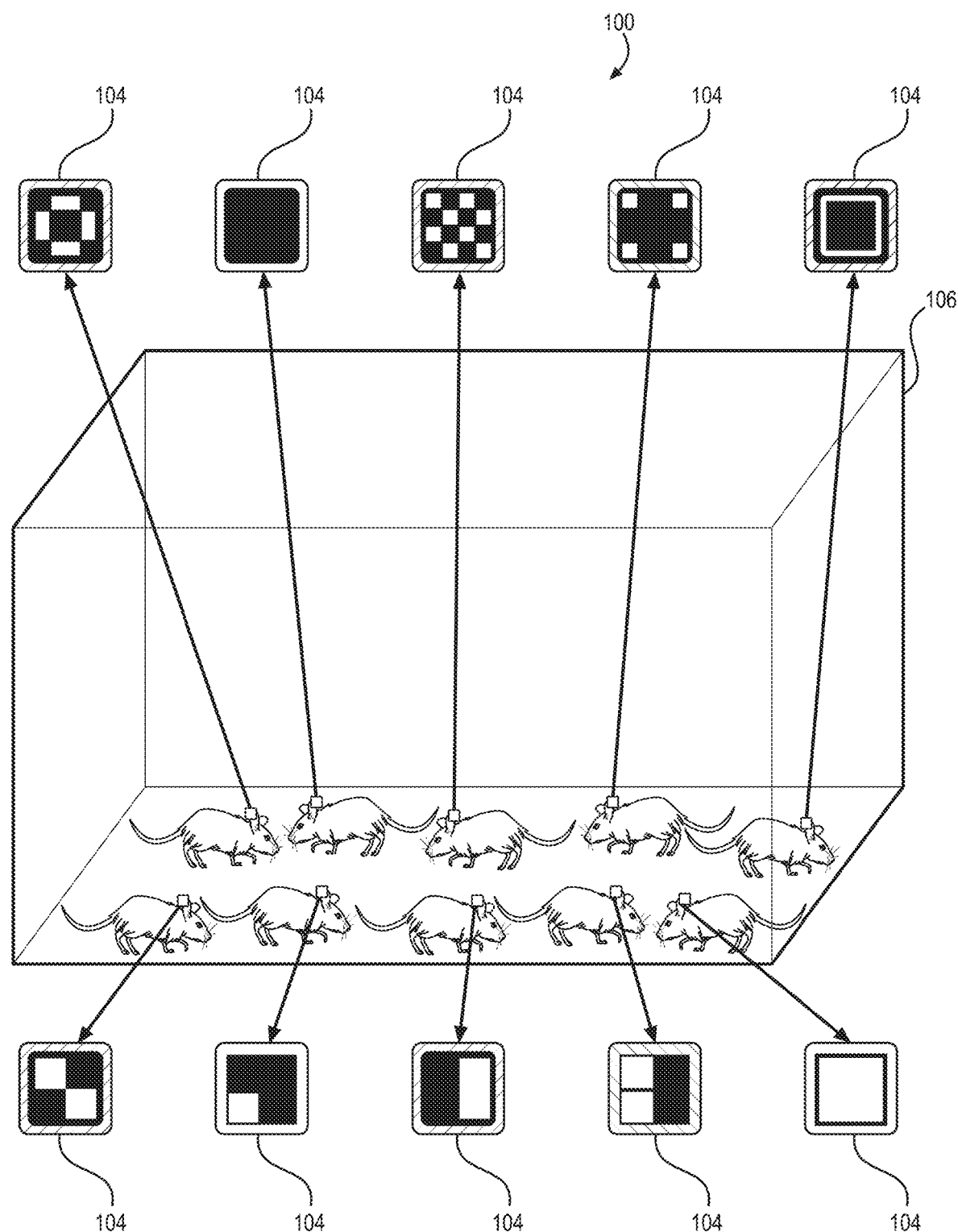
FIG. 7 is a schematic representation of one variation of the animal tracking and identification system.

In another implementation, shown in FIG. 7, the outer face 114 of the identification tag 104 can include pattern of infrared-reflective and infrared-absorptive regions that exhibit distinct colors under visible light. For example, the identification tag 104 can include: infrared-reflective regions—such as the panel 116—characterized by a first color (e.g., white or grey) under visible light; and infrared-absorptive regions—such as the carbon or graphite coating on the panel 116—characterized by a second color (e.g., black) under visible light. Furthermore, the outer face 114 of the identification tag can include a pattern of regions that exhibit varying levels of infrared reflectivity detectable by the optical sensor 108. For example, a first identification tag 104 can include a first region with first infrared reflectivity (e.g., 95%) and a second region with a second infrared reflectivity (e.g., 50%) and a second identification tag 104 can include a first region with a first infrared reflectivity (e.g., 95%) and a second region with a third infrared reflectivity (e.g., 5%). Accordingly, the computer system can identify a single pattern depicted by the identification tag 104 in a first set of images captured during the dark cycle under the infrared illumination and in a second set of images capered during the light cycle under visible light. Therefore, the computer system can identify the animal based on a unique pattern-depicted on the identification tag 104—detectable under both infrared illumination and visible light.

4.2 Cage, Optical Emitter, & Optical Sensor

In one implementation, the controller 110 can interface with an optical sensor 108 (e.g., an RGB camera, a hyperspectral camera): coupled to the cage 106 and/or arranged adjacent the cage 106; defining a field of view facing an interior (or "cage interior", "interior volume") of the cage 106; and configured to capture images of the cage interior at a fixed and/or variable frequency. In particular, the optical sensor 108 can be configured to capture high-resolution images of the cage interior—depicting animals present in the cage 106 and corresponding tags affixed to these animals—and therefore enable detection of tag features of these tags, such as including a particular tag color. In one example, the optical sensor 108 can define an RGB camera configured to capture color images of the cage interior and/or animals within the cage 106. Additionally, in this example, the controller 110 can interface with a light source—such as integrated into the optical sensor 108 and/or affixed to the cage 106—configured to illuminate the cage 106 and thereby enable detection of a particular color of a tag at any time of day or night. The controller 110 can therefore selectively trigger activation of the light source at various times of day or night prior to capturing of an image by the optical sensor 108.

Alternatively, in another example, the optical sensor 108 can define a multispectral camera configured to capture multispectral images of the cage interior and/or animals within the cage 106. In this example, the controller 110 can access images captured by the multispectral camera—such as at any time of day or night—and detect a particular color of a tag depicted in the image, such as regardless of lighting conditions (e.g., infrared light) within the cage 106 and/or a time of day or night.

In one implementation, the optical sensor 108 can be arranged on the ceiling of the cage 106 (or another interior surface of the cage 106) and configured to capture a bird's eye view of the interior of the cage 106. Additionally or alternatively, the optical sensor 108 can be arranged proximal an inlet (e.g., a door, a gate, an entry) of the cage 106 and configured to capture images of animals entering or exiting the cage 106. In one variation, the controller 110 can interface with multiple optical sensors 108 installed at the cage 106 and configured to capture images of the cage interior. For example, the controller 110 can: access images captured by a first optical sensor 108 defining a first field of view spanning a floor of the cage interior; and access images captured by a second optical sensor 108 defining a second field of view intersecting and orthogonal the first field of view within the cage interior.

4.3 Proximity Sensor

In one implementation, the controller 110 can further interface with a proximity sensor 122 (e.g., limit switch, reed switch) coupled to the cage 106 and configured to detect motion (e.g., rotation) of the cage door. For example, the proximity sensor 122 can: generate a signal representing motion of the cage door responsive to a user manually opening or closing the cage door, such as to remove an animal from the cage 106 and/or replace the animal within the cage 106; and output this signal to the controller 110. The controller 110 can then read this signal from the proximity sensor 122 and interpret an instance of an open-door event accordingly.

Furthermore, in one implementation, the controller 110 can selectively trigger the optical sensor 108 to capture a set of images responsive to detected motion of the cage door. In particular, the controller 110 can: receive signals-representing motion (e.g., presence and/or absence of motion) of the cage door-generated by the proximity sensor 122, such as at a target frequency; detect an instance of an open-door event at a first time based on a signal output by the proximity sensor 122 at approximately the first time; and, in response to detecting the instance of the open-door event, trigger the optical sensor 108 to capture the set of images.

4.4 Controller

The system 100 can include a controller 110 (e.g., a processor) communicatively coupled to the optical sensor 108, optical emitter 102, and/or any other sensors arranged within the cage 106.

During the dark cycle, the controller 110 is configured to: trigger the optical emitter 102 to illuminate the interior volume of the animal cage 106, occupied by the population of animals, with light outside of a visible light range (e.g., infrared light); and trigger the optical sensor 108 to capture a first set of images-including a first image—of the interior volume of the animal cage 106.

The controller 110 is further configured to: access the first image from the optical sensor 108; detect a first identification tag 104 in a first region of the first image; extract a first set of tag features from the first region of the first image; identify a first animal identifier of the first animal, tagged with the first identification tag 104, based on the first set of tag features; interpret a first animal position of the first animal occupying the animal cage 106 based on a first pixel position of the first identification tag 104 in the first image; and append an animal cage log with the first animal identifier of the first animal, a first timestamp corresponding to the first time, and the first animal position of the first animal.

Therefore, the controller 110 can autonomously monitor and record the location and movement of individual animals within the cage 106 during low-light conditions by using non-intrusive infrared illumination. This enables precise, uninterrupted tracking of animal activity without human intervention across the dark cycle, supporting accurate behavioral analysis.

During the light cycle, the controller 110 is configured to trigger the optical sensor 108 to capture a second set of images-including the second image—of the interior volume of the animal cage 106.

The controller 110 is further configured to: detect a second identification tag 104 in a second region of the second image; extract a second set of tag features from the second region of the second image; identify a second animal identifier of the second animal, tagged with the second identification tag 104, based on the first set of tag features; interpret a second animal position of the second animal occupying the animal cage 106 based on a second pixel position of the second identification tag 104 in the second image; and append the animal cage log with the second animal identifier of the second animal, a second timestamp corresponding to the second time, and the second animal position of the second animal.

Therefore, the controller 110 can continuously monitor and log the locations of individual animals within the cage 106 during both light and dark cycles. By detecting unique identification tags 104 and recording timestamped positional data, the computer system ensures comprehensive, continuous tracking of animal movements, enabling detailed behavioral analysis and improving data accuracy for research conducted under natural day and night conditions.

5. IMAGE CAPTURE & FRAME RATE

The method S100 includes, during a dark cycle: illuminating an interior volume of an animal cage 106, occupied by a population of animals, with light outside of a visible light range in Block S102; and, at first time, capturing a first image of the interior volume of the animal cage 106 in Block S104. Generally, in Block S102, during the dark cycle—such as at night and in an absence of visible light—the computer system 100 can illuminate the interior volume of the animal cage 106 with light that is not visible to the animals occupying the animal cage 106 in order to illuminate identification tags 104 affixed to ears of the animals occupying the animal cage 106 without disrupting biological rhythms of the animals. In Block S104, the computer system can capture the first image of the animal cage 106, the first image depicting identification tags 104—illuminated by light outside of the visible spectrum-affixed to ears of animals occupying the animal cage 106.

Therefore, in the absence of visible light, the computer system can capture an image depicting of the interior of the animal cage 106 without disrupting activity and/or sleep of the animals occupying the cage 106. Based on the image, the computer system can identify the animals within the cage 106.

In one variation, Block S104 of the method S100 recites capturing a second image of the interior volume of the animal cage 106 at a second time-succeeding the first time-during a light cycle. Generally, in Block S104, the computer system can capture the second image of the interior volume of the animal cage 106 during the light cycle, such as during the daytime and in the presence of visible light. Therefore, the computer system can capture an image of the interior of the cage 106 illuminated by visible light in order to identify the animals within the cage.

In one implementation, during the dark cycle, the computer system can illuminate the interior volume of the animal cage 106 with light within an infrared wavelength band. In this implementation, the computer system can capture the first image-including an infrared image—of the interior volume of the animal cage. For example, the computer system can trigger an optical emitter 102, such as an infrared light emitting diode—to emit light characterized by wavelengths between 1 mm and 700 nm. Therefore, to illuminate the cage 106 during the dark cycle to enhance detectability of identification tags 104 without alerting the animals, the computer system can illuminate the animal cage 106 with infrared light, which is invisible to the animals. Furthermore, the computer system can capture an infrared image of the animal cage, enabling the computer system to detect features of the identification tags 104 of animals in the absence of visible light and to identify the animals based on these features.

In another implementation, at the first time during the dark cycle, the computer system can capture the first image of the interior volume of the animal cage 106 via an optical sensor 108 mounted adjacent the animal cage 106 and defining a field of view facing the interior volume of the animal cage. In this implementation, at the second time during the light cycle, the computer system can capture the second image of the interior volume of the animal cage 106 via the optical sensor 108. For example, the computer system can capture the first image during the dark cycle and the second image during the light cycle by a single hyperspectral camera mounted adjacent an animal cage 106 and defining the field of view facing the interior volume of the animal cage. Therefore, the computer system can leverage a single camera to capture images of the interior of the animal cage 106 during the light cycle and during the dark cycle to minimize equipment resource allocation.

Additionally or alternatively, during the dark cycle, the computer system can capture the first image of the interior volume of the animal cage 106 via a first optical sensor 108 mounted adjacent the animal cage 106 and defining a field of view facing the interior volume of the animal cage. In this implementation, during the light cycle, the computer system can capture the second image of the interior volume of the animal cage 106 via a second optical sensor 108 mounted adjacent the animal cage 106 and defining the field of view facing the interior volume of the animal cage. For example, the computer system can capture the first image during the dark cycle via an infrared camera and capture the second image during the light cycle via an RGB camera. Therefore, the computer system can leverage more than one camera to capture images of the interior of the animal cage 106 during the light cycle and during the dark cycle to resolve tag features with high accuracy under varying light conditions.

5.1 Image Capture Frequency

In one implementation, the computer system can trigger the optical sensor 108 to capture images of the cage interior according to a target sampling frequency (e.g., frame rate of the optical sensor 108). For example, the computer system can trigger the optical sensor 108 to capture a sequence of images at a fixed sampling frequency, such as at a frequency of once-per-minute, once every ten-minute interval, once-per-hour, etc.

In one implementation, the computer system can selectively trigger the optical sensor 108 to capture images of the cage interior according to a dynamic sampling frequency, such as based on expected and/or detected animal activity within and/or at the cage. For example, the computer system can trigger the optical sensor 108 to: capture images at a first frequency during predefined sleep periods during which animals sleep and/or exhibit decreased activity levels; and capture images at a second frequency, exceeding the first frequency, during feeding periods corresponding to scheduled feedings and during which animals exhibit elevated activity levels. In this example, by adjusting the sampling frequency based on the expected activity level of animals, the computer system can minimize collection of redundant and/or trivial data during relatively low-activity periods—thereby limiting resources allocated to transfer and/or storage of redundant and/or trivial data—while increasing collection of high-value data during relatively high-activity periods and therefore increasing quality of stored data.

In one implementation, the computer system can set a frame rate of the optical sensor 108 proportional to an activity level—derived from a sequence of animal positions—of one of the animals occupying the animal cage. More specifically, the computer system can set a frame rate of the optical sensor 108—defining a field of view facing the interior volume of the animal cage 106—proportional to a first activity level of a first animal in response to the first activity level of the first animal exceeding a second activity level of a second animal. Accordingly, the computer system can set the frame rate of the optical sensor 108 proportional to the activity level of an animal that exhibits a highest activity level among animals in the population of animals occupying the animal cage.

Therefore, the computer system can dynamically adjust the frame rate of the optical sensor 108 based on the activity level of the animals in the cage 106 to: minimize resource allocation associated with storage of images and processing of image data during low activity periods; and resolve movements of the animals with greater precision during periods of greater animal activity. Thus, the computer system can improve real-time tracking of animals occupying the animal cage 106 while minimizing the resource allocation associated with data storage and processing by the controller 110.

5.2 Trigger-Based Image Capture

In another implementation, the computer system can selectively trigger the optical sensor 108 to capture images of the cage interior responsive to detection of defined triggers at and/or within the cage. For example, the computer system can selectively trigger the optical sensor 108 to capture an image of the cage 106 (e.g., in near real-time) responsive to: detecting motion of the cage door; detecting an unexpected absence of a particular animal from the cage, such as without prior detection of an exit event for this particular animal; failure to characterize a set of tag features (e.g., a particular color and/or a QR code) of a tag depicted in an image, such as due to an orientation of the animal relative the optical sensor 108 during capture of the image; detecting a high activity level for a particular animal within the cage 106; etc. In these examples, by selectively triggering the optical sensor 108 to capture an additional image or images responsive to these triggers, the computer system can improve quality of data collected—such as corresponding to data that may be most valuable for a particular research study associated with the animal population—and limit compute and/or data storage associated with low-quality and/or low-relevancy data.

6. ANIMAL IDENTIFICATION

Generally, the system can identify a particular animal present in the cage 106 based on a set of tag features—corresponding to a particular tag, in a set of tags, affixed to the animal—detected in an image captured by the optical sensor 108. In particular, the system can: access an image (e.g., color image) captured by the optical sensor 108 at a first time; extract a set of tag features of a tag—such as a color of an outer surface of the identification tag 104—affixed to an animal depicted in the image; access the population of electronic profiles—each electronic profile defining a unique set of tag features of a tag affixed to an animal in the animal population—associated with the animal population; and, in response to a first electronic profile, in the population of electronic profiles, specifying the set of features and corresponding to a first animal in the animal population, interpret presence of the first animal at a particular location within the cage. The system can then: generate a data entry indicating presence of the first animal in the cage 106 at the first time; and store the data entry in the first electronic profile.

6.1 Animal Identification During Dark Cycle

The method S100 includes: detecting a first identification tag 104 in a first region of a first image captured during a dark cycle in Block S106; extracting a first set of tag features from the first region of the first image in Block S108; and identifying a first animal identifier of a first animal, tagged with the first identification tag 104, based on the first set of tag features in Block S110. Generally, in Blocks S106, S108, and S110, the computer system can: detect the first identification tag 104 in a first region of the first image captured during the dark cycle; extract the first set of tag features—such as colors and/or patterns of the identification tag 104—from the first region of the first image; and identify the first animal, tagged with the first identification tag 104 and associated with the first animal identifier, based on the first set of tag features.

For example, the computer system can: detect a first infrared wavelength—emitted by the optical emitter 102—in the first image, the first infrared wavelength representing a tag feature in the first set of tag features and associated with the first animal identifier of the first animal; and identify the first animal in the first image based on the first infrared wavelength. Accordingly, the computer system can identify an animal in the first image based on the first set of tag features—such as infrared wavelength—of the identification tag 104 affixed to the ear of the animal. Therefore, the computer system can facilitate precise and automated animal identification under low-light conditions by leveraging tag-specific features, such as infrared wavelength, enabling non-invasive monitoring and tracking of individual animals without manual intervention or visible light exposure.

6.2 Animal Identification During Light Cycle

In one variation, the method S100 includes: detecting a second identification tag 104 in a second region of the second image captured during the light cycle in Block S106; extracting a second set of tag features from the second region of the second image in Block S108; and identifying a second animal identifier of a second animal, tagged with the second identification tag 104, based on the first set of tag features in Block S110.

For example, the computer system can: detect a first visible color—representing a tag feature in the second set of tag features—in the second image, the first visible color associated with the second animal identifier of the second animal; and identify the second animal in the second image based on the first visible color. Accordingly, the computer system can identify an animal in the second image based on the second set of tag features—such as visible color—of the identification tag 104 affixed to the ear of the animal. Therefore, the computer system can facilitate precise and automated animal identification under visible light conditions by leveraging tag-specific features, such as visible color, enabling non-invasive monitoring and tracking of individual animals without manual intervention.

6.3 Identifying Multiple Animals in a Single Image

In one implementation, the computer system can detect more than one animal in a single image (captured either during the light cycle or the dark cycle) of the interior of the cage 106. More specifically, the computer system can: detect the first identification tag 104 in the first region of the first image; detect the second identification tag 104 in a third region of the first image captured at the first time; extract the first set of tag features from the first region of the first image; extract a third set of tag features from the third region of the first image; identify the first animal identifier of the first animal, tagged with the first identification tag 104, based on the first set of tag features; and identify the second animal identifier of the second animal, tagged with the second identification tag 104, based on the third set of tag features. Accordingly, the computer system can identify both the first animal and the second animal in the first image based on the presence of the first set of tag features and the second set of tag features in the first image. Therefore, the computer system can enable simultaneous and automated identification of multiple animals within the same environment, facilitating efficient and scalable animal tracking.

6.4 Identifying Single Animal Based on Multiple Tags

In one implementation, the computer system can detect two identification tags 104 in an image, each identification tag 104 affixed to a separate ear of a single animal. For example, the computer system can: detect a first identification tag 104—affixed to a first ear of the animal—based on the image (captured during either the dark cycle or the light cycle); and detect a second identification tag 104—affixed to a second ear of the animal-based on the image. More specifically, the computer system can: detect the first identification tag 104, affixed to the first ear of the first animal, in the first region of the first image in Block S106; detect a third identification tag 104 in a third region of the first image, the third identification tag 104 affixed to a second ear of the first animal in Block S106; extract the first set of tag features from the first region of the first image in Block S108; extract a third set of tag features from the third region of the first image in Block S108; identify the first animal identifier of the first animal, tagged with the first identification tag 104, based on the first set of tag features in Block S110; and identify the first animal identifier of the first animal, tagged with the third identification tag 104, based on the third set of tag features in Block S110.

Accordingly, the computer system can detect identification tags 104 on both ears of an animal and then identify the animal based on these tag features by: analyzing separate regions within an image; and extracting tag features from each region. The computer system can detect identification tags 104 on both ears of an animal, enabling animal recognition when one of the identification tags 104 of the animal is not visible in the image, thereby increasing the likelihood that the animal will be recognized. Furthermore, this dual-tag detection enables the computer system to derive a position of each identification tag 104 and derive an orientation of the animal based on these positions. Therefore, the computer system can enhance accuracy and reliability in animal identification by detecting multiple identification tags 104 of a single animal. This dual-tag detection reduces the chance of misidentification, particularly in complex or high-animal-density (e.g., with more than three animals per cage 106) environments, and enables more precise tracking for research and monitoring purposes.

6.5 Animal Identification Based on Tag Color

In one implementation, the computer system can identify an animal based on a visible color reflected by the tag during the light cycle, and/or based on a presence of an infrared wavelength (or a set of wavelengths) reflected from the tag during the dark cycle.

In this implementation, the computer system can: extract the first set of tag features—including a first infrared wavelength—from the first region of the first image captured during the dark cycle, the first infrared wavelength associated with the first animal and/or the first animal identifier; and identify the first animal based on the first infrared wavelength. In this implementation, the computer system can also extract the second set of tag features—including a second visible color associated with the second animal and/or the second animal identifier of the second animal— from the second region of the second image captured during the light cycle; and identify the second animal based on the first visible color. Accordingly, the computer system can identify an animal based on the color reflected (or emitted via florescence) by the identification tag 104 during the light cycle and the dark cycle. Therefore, the computer system can utilize distinct spectral characteristics, such as infrared wavelengths for dark-cycle identification and visible colors for light-cycle identification, thereby enabling tracking of individual animals across varying lighting conditions.

In this implementation, the computer system can also: extract the third set of tag features—including a third infrared wavelength, different from the first infrared wavelength, associated with the second animal—from the third region of the first image captured during the dark cycle; and identify the second animal based on the third infrared wavelength. Therefore, the computer system can detect different colors of the same identification tag 104 under the infrared and under the visible light. The computer system can identify the second animal based on presence of both of the first visible color and the second infrared wavelength in images.

6.6 Animal Identification Based on Tag Pattern

In one implementation, the computer system can identify an animal based on a pattern in either visible or infrared spectrum reflected by the tag during the light cycle and during the dark cycle.

In this implementation, the computer system can: detect the first identification tag 104 in the first region of the first image, the first identification tag 104 including a set of infrared-reflective regions; extract the first set of tag features from the first region of the first image, the first set of tag features representing the set of infrared-reflective regions; and identify the first animal identifier of the first animal based on the first set of tag features representing the set of infrared-reflective regions.

For example, the computer system can: extract the first set of tag features—including an infrared-reflective tag pattern—from the first region of the first image captured during the dark cycle, the infrared-reflective tag pattern associated with the first animal and/or the first animal identifier; and identify the first animal based on the infrared-reflective tag pattern. In this example, the computer system can also extract the second set of tag features—including a visible tag pattern associated with the second animal and/or the second animal identifier of the second animal—from the second region of the second image captured during the light cycle; and identify the second animal based on the visible tag pattern.

Additionally or alternatively, the computer system can: extract the first set of tag features—including a first infrared-reflective tag pattern—from the first region of the first image captured during the dark cycle; and identify the first animal based on the first infrared-reflective tag pattern. The computer system can also: extract the second set of tag features—including a visible tag pattern matching the first infrared-reflective pattern—from a second region of the second image captured during the light cycle; and identify the first animal based on the visible tag pattern.

Therefore, the computer system can reliably identify animals in images captured during both dark and light cycles based on distinct tag patterns of identification tags 104 that are visible under infrared and/or visible light. This enables continuous and accurate animal identification across varying lighting conditions without altering the environment within the cage 106 and interrupting the behavior of the animals.

6.7 Animal Identification Based on Reference Features

In one implementation, the computer system can identify an animal in an image based on correspondence between a set of tag features of an identification tag 104 depicted in the image and a set of reference tag features stored in a memory of the controller 110 and/or the electronic profile of the animal.

In one implementation, the computer system can: characterize a first difference between the first set of tag features detected in the first image and a first target set of tag features of the first identification tag 104 (stored in a memory of the controller 110); in response to the first difference falling below a threshold difference, match the first set of tag features to the first target set of tag features; and identify the first animal identifier associated with the first target set of tag features. For example, the computer system can: access the first image depicting the first identification tag 104 of the first animal partially obscured by a second animal; extract the first set of tag features, such as a first pattern, of the first identification tag 104 from the first image; calculate a pixel-by-pixel difference between corresponding pixel values of the first pattern of the first identification tag 104 and a target pattern associated with the first animal identifier of the first animal; in response to the pixel-by-pixel difference falling below the threshold difference, match the first pattern to the target pattern associated with the first animal identifier; and identify the first animal identifier based on the first pattern.

Accordingly, the computer system can: accurately match a set of tag features detected in an image to a predefined target set of tag features associated with an animal by calculating a difference between the set of tag features and the target set of tag features; and identify the animal based on the match. This enables reliable identification of animals by characterizing differences between tag features detected in the image and stored reference patterns, even when an identification tag 104 is only partially visible in the image (e.g., due to being obscured by another animal, due to identification tag 104 having an angular orientation relative to the optical sensor 108, due to light reflection off the surface of the identification tag).

Therefore, the computer system can: precisely identify individual animals in the cage 106 based on patterns of their identification tags, thereby enabling tracking and monitoring of the animals without human intervention; and minimize identification errors due to inconsistent depictions of identification tags 104 in the images.

6.7.1 Animal Identification Based on Similarity Scores

In one implementation, the system can detect presence of a particular animal within the cage 106 based on a similarity between a set of tag features—extracted from an image captured by the optical sensor 108—and a unique set of tag features defined for this particular animal in an electronic profile affiliated with the animal. For example, the system can: access an image captured by the optical sensor 108 at a first time; detect a tag affixed to an animal in a first location within the image; and extract a set of tag features—such as presence of one or more colors, a QR code, a particular pattern, etc.—of the identification tag 104 from the image. The system can then: access a first electronic profile, in a population of electronic profiles, corresponding to a first animal in the animal population and defining a first set of tag features; derive a first similarity score representing similarity of the first set of tag features defined in the first electronic profile to the set of tag features detected in the image; and, in response to the first similarity score exceeding a threshold score, detect presence of the first animal at the first location within the cage 106 at the first time.

Alternatively, in response to the first similarity score falling below the threshold score, the system can: withhold detecting presence of the first animal at the first location; access a second electronic profile, in a population of electronic profiles, corresponding to a second animal in the animal population and defining a second set of tag features; derive a second similarity score representing similarity of the second set of tag features defined in the second electronic profile to the set of tag features detected in the image; and, in response to the second similarity score exceeding the threshold score, detect presence of the second animal at the first location within the cage 106 at the first time.

Yet alternatively, in response to the second similarity score falling below the threshold score, the system can repeat this process—such as for each animal in the animal population—to identify a particular animal corresponding to the set of tag features depicted in the image.

Additionally or alternatively, the computer system can leverage a combination of tag features extracted from the image to detect presence of a particular animal at a particular confidence level. For example, a first tag—affixed to a first animal in the animal population—can define: an inner surface of a first color and an outer surface—opposite the inner surface—of a second color distinct from the first color. In this example, the computer system can: access a first image depicting the first tag—affixed to the first animal and at a first location—and captured by a first optical sensor 108 defining a first field of view; detect the first color of the inner surface in the first image; access an electronic profile affiliated with the first animal and defining a set of tag features including the first color of the inner surface and the second color of the outer surface; and, based on the first color of the inner surface of the first tag in the image corresponding to the first color defined by the electronic profile, detect presence of the first animal at the first location according to a first confidence score.

Then, in response to the first confidence score falling below a threshold confidence, the computer system can: access a second image captured by a second optical sensor 108 defining a second field of view and depicting the first tag—at approximately the first location—affixed to the first animal; detect the second color of the outer surface in the second image; and, based on the first color of the inner surface of the first tag depicted in the first image corresponding to the first color defined by the electronic profile, and based on the second color of the outer surface of the first tag depicted in the second image corresponding to the second color defined by the electronic profile, detect presence of the first animal at the first location according to a second confidence score exceeding the first confidence score. In another example, the computer system can similarly leverage subsequent images recorded by a singular optical sensor 108 to detect additional tag features of a particular tag depicted in these images.

The computer system can therefore leverage identification of multiple tag features of a tag depicted in images captured by one or more optical sensor 108s—arranged on and/or within the cage 106—to detect presence of an animal at a particular location within the cage 106 with increased accuracy and confidence. Furthermore, the computer system can detect presence of a particular animal—associated with a unique set of tag features-based on detection of only a subset of tag features in the set of tag features, such as due to obstruction of a field of view of the optical sensor 108 and/or a particular orientation of the animal relative the optical sensor 108.

6.8 Color Calibration

In one implementation, the computer system can identify a color of an identification tag 104 depicted in an image based on a calibration card 124—depicting a predefined set of colors of tags—arranged within and/or adjacent the cage.

In one implementation, the computer system can: detect a calibration card 124 in the first image captured during the dark cycle in Block S120, the calibration card 124 depicting a reference infrared wavelength of the first animal identifier in a first target region of the calibration card 124; extract the first set of tag features—including a first infrared wavelength—from the first region of the first image; and identify the first animal identifier of the first animal, tagged with the first identification tag 104, in response to the first infrared wavelength approximating the reference infrared wavelength. For example, the computer system can identify the first animal identifier of the first animal in response to a first color value of the first infrared wavelength approximating (e.g., falling within a threshold difference of) a second color value of the reference infrared wavelength. Accordingly, the computer system can identify the first animal identifier of the first animal based on the first infrared wavelength of the first animal identifier matching the reference infrared wavelength depicted on the calibration card 124, the reference infrared wavelength known to represent a color of the first animal identifier under infrared light.

In this implementation, the computer system can also: detect the calibration card 124 in the second image captured during the light cycle in Block S120, the calibration card 124 depicting a reference visible color of the second animal identifier in a second target region of the calibration card 124; extract the second set of tag features—including a second visible color—from the second region of the second image; and identify the second animal identifier of the second animal, tagged with the second identification tag 104 in response to the second visible color approximating the target visible color. For example, the computer system can identify the second animal identifier of the second animal in response to the second animal identifier and the second target region on the calibration card 124 being characterized by a same shade of blue. Accordingly, the computer system can identify the second animal identifier of the second animal based on the second visible color of the second animal identifier matching the reference visible color depicted on the calibration card 124, the reference visible color known to represent a color of the second animal identifier under visible light.

Therefore, the computer system can leverage the calibration card 124 to identify an animal identifier of an animal based on a color of an identification tag 104, depicted in an image, despite possible color distortions that may occur in the image due to lighting variations. Furthermore, based on the calibration card 124, the computer system can re-identify an animal following replacement of the optical emitter 102 and/or the optical sensor 108, enabling the computer system to identify animals after being upgraded or updated with replacement parts.

In particular, in this implementation, the computer system can leverage this calibration card 124 to interpret colors of tags depicted in grey-scale images captured by the optical sensor 108, such as captured by an RGB camera in the dark and/or in the absence of an external light source.

For example, the calibration card 124 can include a first region including a red surface, a second region including a green surface, and a third region including a blue surface. In this example, the computer system can: associate the first region with a red color; associate the second region with a blue color; and associate the third region with a green color. The computer system can then: access a first grey-scale image captured at a first time by the optical sensor 108 and depicting a first tag of a first color affixed to an animal within the cage 106; access a second grey-scale image captured at approximately the first time (e.g., within 60 seconds) by the optical sensor 108 and depicting the calibration card 124; characterize a set of differences between the first color of the first tag and a color of each of the first, second, and third regions of the calibration card 124; and selectively match the first color of the first tag to a particular region—and corresponding color—of the calibration card 124 based on the set of differences. For example, in response to a first difference, in the set of differences, between the first color of the first tag and the red surface of the first region of the calibration card 124 falling below each other difference, in the set of differences, the computer system can interpret the first color as a red color based on association of the first region of the calibration card 124 with the red color.

7. TAG-LESS ANIMAL IDENTIFICATION

In one variation, the controller 110 can identify an animal based on a set of animal features of the animal depicted in the image captured by the optical sensor 108. More specifically, the controller 110 can, at a first time: access an image captured by the optical sensor 108; and detect a set of features of an animal depicted in the image, such as including animal size, animal coat color, animal coat thickness, tail length, ear vein pattern, and/or any other characteristic of the animal. Then, the controller 110 can link the set of features to an electronic profile of a first animal, the electronic profile including the set of features; and, in response to linking the set of tag features with the electronic profile, interpret presence of the first animal in the cage 106; and populate the electronic profile with a data entry indicating presence of the first animal inside the cage. In this implementation, the computer system can store the set of animal features of the first animal—such as including the size of the first animal, the coat color of the first animal, the coat thickness of the first animal, the tail length of the first animal, the ear vein pattern of the first animal, and/or any other characteristic of the first animal—within the electronic profile associated with the first animal. Therefore, the computer system can: identify the first animal in the image based on the set of set of features representing animal characteristics; and, in response to identifying the first animal in the image, detect presence of the first animal in the cage.

8. INTERPRETING ANIMAL POSITION

Block S112 of the method S100 includes interpreting a first animal position of the first animal occupying the animal cage 106 based on a first pixel position of the first identification tag 104 in the first image captured during the dark cycle. In one variation, Block S112 of the method S100 includes interpreting a second animal position of the second animal occupying the animal cage 106 based on a second pixel position of the first second identification tag 104 in the second image captured during the light cycle. Generally, in Block S112, the computer system can detect an animal position—such as a pixel position in an image or a relative position in the cage 106—of the animal based on a pixel position of an identification tag 104 in an image. Therefore, the computer system can track animal positions within a cage 106 by determining pixel coordinates of identification tags 104 in images captured by the optical sensor 108. This enables precise, non-intrusive monitoring of movements of individual animals in real time.

In one implementation, the computer system can: detect a first set of two-dimensional pixel coordinates of a set of pixels representing the first identification tag 104 in the first image; and store the first set of two-dimensional pixel coordinates as the first animal position of the first animal at the first time. Accordingly, the computer system can detect the two-dimensional pixel coordinates of an identification tag 104 of an animal in an image and record these coordinates as an animal position at a specific time. Therefore, the computer system can automatically track animal movement based on pixel-level data, thereby enabling analysis of animal movement and behavior.

In another implementation, the computer system can: detect a first set of two-dimensional pixel coordinates of a set of pixels representing the first identification tag 104 in the first image; map the first set of two-dimensional pixel coordinates to a second set of two-dimensional cage coordinates in a coordinate system of the animal cage 106; and store the second set of two-dimensional cage coordinates as the first animal position of the first animal at the first time. Accordingly, the computer system can detect a position of an animal within a cage 106 by mapping pixel coordinates of its identification tag 104 from an image to a corresponding two-dimensional coordinate system of the cage 106. Therefore, the computer system can translate pixel positions into physical positions within the cage 106, enabling tracking of animal movement and analysis of animal behavior.

In another implementation, the computer system can interpret animal position of an animal based on pixel positions of two animal identifiers—each animal identifier affixed to a separate ear of the animal—in an image. More specifically, the computer system can: detect a first animal identifier of the first animal; based on the first set of tag features of the first animal identifier, identify the first animal; detect a third animal identifier of the first animal in the first image; and, based on the third set of tag features of the third animal identifier, identify the first animal. The computer system can then: detect a first pixel position of the first identification tag 104, associated with the first animal, in the first image in Block S138; detect a third pixel position of the third identification tag 104, associated with the first animal, in the first image in Block S140; and interpret a first animal position of the first animal based on the first pixel position of the first identification tag 104 and the third pixel position of the third identification tag 104 in Block S112.

For example, the computer system can: calculate an average pixel position between the first pixel position and the third pixel position; and store the average pixel position as the animal position of the first animal. By detecting multiple identification tags 104—such as two identification tags 104 affixed to each ear of the animal—of a single animal in an image, the computer system can track positions of animals within the cage 106 with increased accuracy, thereby enabling the user to interpret animal movement and biomarkers with greater accuracy.

9. INTERPRETING ANIMAL ORIENTATION+SIZE

In one implementation, the computer system can interpret animal orientation of an animal based on pixel positions of two animal identifiers—each animal identifier affixed to each ear of the animal—in an image. More specifically, the computer system can: detect a first animal identifier of the first animal; based on the first set of tag features of the first animal identifier, identify the first animal; detect a third animal identifier of the first animal in the first image; and, based on the third set of tag features of the third animal identifier, identify the first animal. The computer system can then: detect a first pixel position of the first identification tag 104, associated with the first animal, in the first image in Block S138; detect a third pixel position of the third identification tag 104, associated with the first animal, in the first image in Block S140; interpret a first animal orientation of the first animal based on the first pixel position of the first identification tag 104 and the third pixel position of the third identification tag 104 in Block S142; and append the animal cage log with the first animal orientation of the first animal in Block S144.

Accordingly, the computer system can: detect two animal identifiers in the first image, each animal identifier affixed to a separate ear of the first animal; detect a first pixel position of the first animal identifier and a third pixel position of the third animal identifier in the third first image; and, based on the first pixel position and the third pixel position, infer the orientation of the first animal.

Therefore, the computer system can track orientation of the animals in the cage 106, thereby enabling the user to analyze animal movement and interactions (with each other and the environment) with higher accuracy and resolution than based on position data only.

In another implementation, the computer system can interpret animal size of an animal based on pixel positions of two animal identifiers—each animal identifier affixed to each ear of the animal—in an image. More specifically, the computer system can estimate a first animal size of the first animal based on a magnitude of a distance between the first pixel position of the first identification tag 104 and the third pixel position of the third identification tag 104; and append the animal cage log with the first animal size of the first animal.

Accordingly, the computer system can: detect two animal identifiers in the first image, each animal identifier affixed to a separate ear of the first animal; detect a first pixel position of the first animal identifier and a third pixel position of the third animal identifier in the third first image; and, based on the first pixel position and the third pixel position, estimate animal size of the first animal.

10. ANIMAL CAGE LOG

Block S114 of the method S100 includes appending an animal cage log with: a first animal identifier of a first animal; a first timestamp corresponding to a first time during a dark cycle; and a first animal position of the first animal. In one variation, Block S114 of the method includes appending the animal cage log with: a second animal identifier of a second animal; a second timestamp corresponding to a second time during a dark cycle; and a second animal position of the second animal. Generally, in Block S114, the computer system can record animal data—such as timestamped animal position—derived from an image of an interior of the cage 106 captured at a first time, in a cage log (e.g., electronic record). Therefore, the computer system can maintain a record of timestamped animal positions of each animal in the population of animals in the cage 106, thereby enabling a user (or the computer system) to infer animal behavior based on sequences of animal positions recorded in the log. For example, the computer system can infer behaviors—such as eating, sleeping, grooming, scratching, and/or rearing—of an animal based on sequences of animal positions recorded in the log.

In one example, the computer system can periodically (e.g., once per day) export a copy of the cage log to a remote computer system of the user. The user may access the copy of the cage log and process data recorded in the copy of the log to infer animal behavior and/or any other biomarkers of each animal occupying the cage 106 during the time period represented in the copy of the cage log. Additionally or alternatively, the computer system can stream timestamped animal positions and corresponding animal identifiers to the remote server of the user. The user may access and process the streamed data to infer animal behavior and/or any other biomarkers in real-time.

10.1 Recording Unknown Animal Location

In one implementation, the computer system can: detect an absence of a third identification tag 104 in the first image in Block S122; access a third animal identifier of a third animal, tagged with the third identification tag 104 in Block S124; and append the animal cage log with the third animal identifier of the third animal, the first timestamp corresponding to the first time, and a flag indicating unknown location of the third animal in Block S126. For example, the computer system can detect an absence of the third identification tag 104 in the first image if the third identification tag 104 is not depicted in the image, such as due to the third identification tag 104 being obscured from the view of the optical sensor 108 by an animal, due to third animal not being present in the cage 106, or due to the third animal being inside a nest box arranged within the cage 106.

Accordingly, the computer system can: detect an absence of a specific animal in an image; retrieve an animal identifier of the specific animal; and log the animal absence, a corresponding timestamp, and a flag for unknown location.

Therefore, the computer system can record instances of both animal presence and animal absence in an image, thereby generating a continuous and complete log of location status of each animal in the population of animals in the cage 106, thereby ensuring integrity of data in the log and enabling accurate interpretations of animal behavior based on this data. Furthermore, by recording instances of animal absence in the images, the computer system can enable the user to identify technical issues—such as optical sensor 108 blind spots—of the system 100, which can result in frequent/persistent unknown location flags in the log. Furthermore, by recording instances of animal absence in the images, the computer system can enable the user to infer animal behaviors, such as hiding.

In another implementation, the computer system can: detect an absence of the first identification tag 104 of the first animal in the image; detect a set of animal features representing the first animal in the image proximal a first animal position of the first animal inferred at a preceding time; based on the set of animal features, infer a presence of the first animal in the cage 106; infer a second animal position of the first animal in the image; and log the second animal position in the animal log. Accordingly, the computer system can detect an absence of the first identification tag 104 of the first animal in a series of images and yet identify the first animal associated with the first identification tag 104 in the series of images based on the set of animal features and the last known animal position of the first animal. Therefore, the computer system can track the first animal during a temporary absence of the first identification tag 104 in the series of captured images. For example, the computer system can track the first animal while the first identification tag 104 of the first animal is blocked from a field of view of the optical sensor 108 by a second animal.

Once the computer system detects the presence of the first identification tag 104 in an image, the computer system can verify that an animal identified as the first animal in the absence of the first identification tag 104 is the first animal and confirm an association of the second animal position (i.e., animal position detected in the absence of the identification tag 104 in the image) with the first animal. Alternatively, in response to detecting that the animal identified as the first animal in the absence of the first identification tag 104 is not the first animal, the computer system can flag the second animal position for review.

10.2 Cage Census Data

In one implementation, based on a feed of images captured by the optical sensor 108, the computer system can: detect identities of a population of lab animals present within the cage 106; and track a quantity of animals present in the cage 106 over time. The computer system can therefore maintain a record of timeseries census data—representing identities and/or quantities of animals detected in the cage 106 over time—for a particular cage 106 transiently occupied by an animal population, such as throughout a duration of a research study affiliated with the animal population.

In this implementation, the controller 110 can: at a first time, access a first image of the interior of the cage 106 including an animal population. Then, for each animal depicted in the first image: extract a set of tag features of a tag of the animal depicted in the image; link the set of tag features to an electronic profile of the animal, the electronic profile associated with the set of tag features; and, in response to linking the set of tag features to the electronic profile, interpret presence of the animal within the cage 106 at a first time and derive the quantity and identities of the animals present in the cage 106 at the first time. Then, the controller 110 can also: generate a notification indicating the quantity of animals in the cage 106 and/or identities of animals in the cage 106; and transmit the notification to a user (e.g., laboratory technician) associated with animal population.

Therefore, based on the image captured by the optical sensor 108, the controller 110 can: derive a quantity of animals present in the cage 106 at the first time; detect identities of the animals present in the cage 106 at the first time; populate a database and/or the cage log with the quantity of animals and identities of animals present in the cage 106; and report the quantity and identities of the animals to a user or group of users affiliated with the animal population.

10.3 Occupancy Tracking

In one implementation, the controller 110 can, at a first time: access a first image from the optical sensor 108; detect a set of tag features of a tag of an animal depicted in the first image; initiate an electronic profile of the first animal in a digital database of electronic profiles of an animal population; store the set of tag features in the electronic profile; and populate the electronic profile and/or the cage log with a first data entry indicating a first entrance event of the first animal into the cage 106 occurring at a first time. Therefore, the controller 110 can, in response to detecting that the first animal has entered the cage 106 for the first time: initiate the electronic profile of the first animal in the digital database; associate the set of tag features of the identification tag 104 of the first animal with the electronic profile; and record the first entrance event of the first animal into the cage 106 in the electronic profile.

In this implementation, the controller 110 can, at a second time: access a second image captured by the optical sensor 108; extract a second set of tag features of a tag of an animal depicted in the second image; link the second set of tag features to the electronic profile of the first animal based on a similarity between the second set of tag features and the first set of tag features, included in the electronic profile, exceeding a threshold similarity; in response to linking the second set of tag features to the electronic profile of the first animal, interpret presence of the first animal inside the cage 106; and populate the electronic profile and/or the cage log with a second data entry indicating presence of the first animal in the cage 106 at the second time. Therefore, in response to detecting, in the second image, the second set of tag features corresponding to the electronic profile of the first animal, the controller 110 can: interpret presence of the first animal within the cage 106; and record presence of the first animal within the cage 106 in the electronic profile of the first animal.

In this implementation, the controller 110 can, at a third time: access a third image captured by the optical sensor 108; extract a third set of tag features of a tag of an animal depicted in the third image; and, in response failing to link the third set of tag features to each set of tag features of each electronic profile in the database of electronic profiles, interpret absence of the first animal from the cage 106 at the third time and record an exit event of the first animal from the cage 106 occurring at the third time. More specifically, the controller 110 can: calculate a similarity score between the third set of tag features and each set of tag features corresponding to each electronic profile in the database of electronic profiles; and, in response to each similarity score falling below the score threshold, detect the exit event. In response to detecting the exit event, the controller 110 can populate the electronic profile and/or the cage log with a third data entry indicating the exit event occurring at the third time. Therefore, in response to failing to link the third set of tag features to the first set of tag features, the controller 110 can: detect the exit event of the first animal from the cage 106; and record the exit event of the electronic profile of the first animal.

In this implementation, the controller 110 can, at a fourth time: access a fourth image captured by the optical sensor 108; detect a fourth set of tag features of a tag of an animal depicted in the fourth image; link the fourth set of tag features to the first set of tag features associated with the electronic profile of the first animal; in response to linking the fourth set of tag features to the first set of tag features, interpret presence of the first animal in the cage 106 at the fourth time and interpret a second entrance event of the first animal into the cage 106 occurring at a fourth time; and populate the electronic profile and/or the cage log the fourth data entry indicating the second entrance event occurring at the fourth time. Therefore, the controller 110 can, in response to detecting presence of the first animal in the cage 106 following absence of the first animal from the cage, detect a re-entry of the first animal into the cage 106 and record the second entrance event in the electronic profile of the first animal.

10.4 Animal Activity Level & Behavior

In one implementation, the controller 110 can derive an activity level and/or animal behaviors (e.g., eating, drinking, grooming, rearing) of an animal occupying the cage 106 based on the animal positions recorded in the cage log. More specifically, the controller 110 can leverage detection of the animal at different locations within the cage 106 over time to interpret the activity level and/or behaviors of the animal over a particular time period.

More specifically, for a first animal, the computer system can: access a first sequence of animal positions—including a first animal position detected at a first time during a dark cycle—of the first animal from an animal cage log in Block S128; and derive a first activity level (or behavior) of the first animal based on the first sequence of animal positions in Block S130. Similarly, for a second animal, the computer system can: access a second sequence of animal positions—including a second animal position of a second animal—from the animal cage log in Block S128; and derive a second activity level or (behavior) of the second animal based on the second sequence of animal positions in Block S130. For example, the computer system can derive the first activity level for the first animal exceeding the second activity level of the second animal if the first sequence of animal positions is characterized by a greater spatial distribution than the second sequence of animal positions.

In another implementation, the computer system can implement computer vision techniques to interpret different behaviors of an animal (e.g., grooming, eating) based on changes in position or pose of the animal detected and tracked across multiple images based on an identifier of the animal derived from an identification tag detected and tracked across these images.

Accordingly, the computer system can access position data for individual animals from the cage log and determine the activity levels and behaviors of an individual animal based on changes in position of the animal over a certain time period. Therefore, based on position data recorded in the cage log, the computer system can automatically and continuously track animal activity levels and behaviors without human intervention.

In this implementation, the computer system can further append the cage log with the activity level and the first timestamp associated with the first time during the dark cycle. By deriving the activity level and recording the activity level in the cage log, the computer system can automatically track the activity level of the animals in the cage 106 in real-time.

Additionally, or alternatively, the computer system can: access a target animal behavior defined by the user in Block S152; infer a first animal behavior based on a sequence of animal positions recorded in the cage log; and, in response to the first animal behavior of the first animal matching the target animal behavior, notify the user, thereby enabling the user learn when the target behavior occurs. More specifically, the computer system can: access a target activity level-exceeding a threshold activity level—of an animal, set by the user; infer a first activity level of the first animal base on a sequence of animal positions recorded in the cage log; and, in response to the first activity level exceeding the threshold activity level, generate a notification indicating the first activity level of the first animal exceeding the threshold activity level in Block S154 and transmit the notification to a user in Block S156.

Accordingly, the computer system can: infer animal behavior, such as high activity, in real-time; and, in response to the animal behavior approximating a target animal behavior, notify the user. Therefore, the computer system can enable the user to learn that the animal behavior matched the target animal behavior without manually observing the animal. For example, this enables the user to observe the animal exhibiting the target behavior or to collect a tissue sample from the animal in a certain state (e.g., exhibiting the target behavior) without manually monitoring the animal for the target behavior.

In another implementation, at a first time, the controller 110 can: access a first image captured by the optical sensor 108; extract a set of tag features of a tag of an animal depicted in the first image; link the set of tag features to an electronic profile of a first animal associated with the set of tag features; and derive a first position of the first animal inside the cage 106 based on the first image. For example, the controller 110 can derive the first position representing a first location, (x, y), of the first animal within the cage 106 and a first orientation, (a), of the first animal. Then, at a second time, the controller 110 can: access a second image from the optical sensor 108; extract a second set of tag features of a tag of an animal depicted in the second image; link the second set of tag features to the electronic profile of the first animal; and derive a second position of the animal inside the cage 106 based on the second image.

The controller 110 can then characterize a difference between the first position and the second position. In response to the difference falling below a threshold difference, the controller 110 can: detect a low activity level of the first animal; generate a first activity data entry including an activity value representing the low activity level of the animal and a timestamp corresponding to the second time; and store the first activity data entry in the electronic profile associated with the first animal. The controller 110 can similarly generate additional activity data packets—representing activity levels of the animal detected over time—and store these activity data packets in the electronic profile to assemble a timeseries of activity levels representing change in activity level of the first animal.

Furthermore, the controller 110 can leverage the activity level of the animal—such as in combination with other animal data captured for the animal—to characterize health of the animal. For example, in response to detecting an activity level of the animal below a nominal activity level, the controller 110 can: infer that the first animal is sick; generate a notification indicating that the first animal is exhibiting a lower than expected activity level; and transmit the notification to the user. Upon receiving the notification, the user may examine the first animal and provide veterinary care, if needed. Furthermore, in response to detecting an activity level of the first animal below a nominal activity level, the controller 110 can: access the electronic profile of the first animal and populate the electronic profile and/or the cage log with a data entry indicating a low activity level of the first animal occurring at a particular time.

10.5 Health Indicators

In one implementation, the controller 110 can derive and track a set of health indicators—such as including an animal size, an activity level, a social activity level, a sleep duration, and/or a wake period duration—of the animal population in the cage 106 based on data extracted from the image feed. Based on these health indicators, the computer system (and/or a researcher) can derive additional insights into animal health and/or effectiveness of a particular treatment administered to animals in the animal population.

For example, the computer system can: track a first timeseries of health indicators for a first animal, in a control group, during a research period for a study; track a second timeseries of health indicators for a second animal, in a treatment group designated to receive a series of dosages of a particular treatment throughout the research period; derive a set of differences between the first timeseries and the second timeseries of health indicators; and generate a report—including the first timeseries of health indicators, the second timeseries of health indicators, and the set of differences—and transmit this report to a group of researchers associated with the study. Rather than manually observe the first and second mouse for extended durations throughout the research period, this group of researchers may then rapidly review this report to derive further insights related to effectiveness of the particular treatment and/or changes in health indicators due to administration of the particular treatment.

In one example, at a first time, the controller 110 can: access a first image captured by an optical sensor 108; extract a set of tag features of a tag of an animal depicted in the image; link the set of tag features to an electronic profile of a first animal, the electronic profile including set of tag features; and, based on the first image, derive a first health indicator of the first animal. For example, based on the first image, the controller 110 can: identify a subpopulation of animals in the image; calculate proximity of the first animal to the subpopulation of animals; and, based on proximity of the first animal to the subpopulation of animals, derive a health indicator indicative of the social activity level of the first animal. Then, the controller 110 can populate the electronic profile of the first animal and/or the cage log with the health indicator (i.e., value indicating the social activity level) derived at the first time. Therefore, the controller 110 can track health indicators of the animal population in the cage, thereby enabling the user to compare health indicators of interest of different groups of animals.

In one implementation, in response to a health indicator of a first animal exceeding a threshold and/or deviating from an expected health indicator, the controller 110 can: trigger the optical sensor 108 to capture a set of images; populate the electronic profile of the first animal with a data entry including the set of images; generate a notification indicating the health indicator exceeding a threshold; and transmit the notification to the user. Then, the user may access the set of images stored in the animal profile and review the set of images. For example, the controller 110 can: detect a proximity level of the first animal relative a second animal within the cage 106; and, in response to the proximity level exceeding a threshold proximity level, interpret an interaction between the first animal and the second animal. The controller 110 can then trigger the optical sensor 108 to capture one or more (additional) images of the interaction between the first animal and the second animal. The user may then review these images, such as to investigate whether the interaction corresponds to a friendly interaction or an aggressive interaction.

11. OPERATIONS RECORD

In one implementation, the controller 110 can track operational data associated with the cage 106 and/or execution of a research study associated with the animal population. For example, the controller 110 can: track cage 106 cleaning events, feeding events, and/or intervention administration events (e.g., drug administration); compile operational data representing occurrence of these events in the digital database; generate a timestamped log of these events; and periodically (e.g., every month) transmit this timestamped log of events to a user affiliated with the research study.

In particular, in this implementation, the computer system can: access a research schedule defining a series of scheduled cleaning events, feeding events, and/or intervention administration events; and selectively notify a user of detected deviations from this research schedule. For example, the research schedule can define: a maximum quantity of days between cleaning events (e.g., cleaning of the cage interior); a series of particular dates and/or times of feeding and/or intervention administration events for each animal in the animal population; etc. In this example, the controller 110 can: track cage 106 cleaning events; and, in response to detecting absence of a cleaning event at an expected time, notify the user of absence of the cleaning event.

For example, the controller 110 can access an image captured by the optical sensor 108 at a first time to detect absence, within the image, of the set of tag features associated with a tag of each animal of the animal population present in the cage 106 at a second time preceding the first time. In response to detecting the absence of the set of tag features in the image, detecting emptying of the cage 106 and recording, in the digital database, a cleaning event occurring at the first time. Additionally or alternatively, the controller 110 can detect a cleaning event in response to detecting, in the image, a set of tag features indicating removal of bedding from the cage, presence of a human hand within the cage, and/or presence of cleaning equipment, such as a brush or a wipe, within the cage 106. In response to detecting these features, the controller 110 can record a cleaning event.

12. CONCLUSION

The computer systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method for animal identification and tracking comprises:
   during a dark cycle:
      illuminating an interior volume of an animal cage, occupied by a population of animals, with light outside of a visible light range via an optical emitter; and
      at a first time, capturing a first image of the interior volume of the animal cage;
   detecting a first identification tag in a first region of the first image;
   extracting a first set of tag features from the first region of the first image;
   identifying a first animal identifier of a first animal, tagged with the first identification tag, based on the first set of tag features;
   interpreting a first animal position of the first animal occupying the animal cage based on a first pixel position of the first identification tag in the first image;
   appending an animal cage log with:
      the first animal identifier of the first animal;
      a first timestamp corresponding to the first time; and
      the first animal position of the first animal;
   during a light cycle:
      at a second time succeeding the first time, capturing a second image of the interior volume of the animal cage;
   detecting a second identification tag in a second region of the second image;
   extracting a second set of tag features from the second region of the second image;
   identifying a second animal identifier of a second animal, tagged with the second identification tag, based on the first set of tag features;
   interpreting a second animal position of the second animal occupying the animal cage based on a second pixel position of the second identification tag in the second image; and
   appending the animal cage log with:
      the second animal identifier of the second animal;
      a second timestamp corresponding to the second time; and
      the second animal position of the second animal.

2. The method of claim 1, further comprising:
   detecting the second identification tag in a third region of the first image;
   extracting a third set of tag features from the third region of the first image;
   identifying the second animal identifier of the second animal, tagged with the second identification tag, based on the third set of tag features;
   interpreting a third animal position of the second animal occupying the animal cage based on a third pixel position of the second identification tag in the first image; and
   appending the animal cage log with:
      the second animal identifier of the second animal;
      the first timestamp corresponding to the first time; and
      the third animal position of the second animal.

3. The method of claim 2:
   wherein extracting the first set of tag features from the first region of the first image comprises extracting the first set of tag features comprising a first infrared wavelength from the first region of the first image, the first infrared wavelength:
      identifying the first animal;
   wherein extracting the second set of tag features from the second region of the second image comprises extracting the second set of tag features comprising a second visible color from the second region of the second image, the second visible color identifying the second animal; and
   wherein extracting the third set of tag features from the third region of the first image comprises extracting the third set of tag features comprising a third infrared wavelength from the third region of the first image, the third infrared wavelength:
      identifying the second animal; and
      different from the first infrared wavelength.

4. The method of claim 1:
   further comprising detecting a calibration card in the first image, the calibration card depicting a target infrared color of the first animal identifier, the target infrared color representing a target set of wavelengths within an infrared wavelength band;
   wherein extracting the first set of tag features from the first region of the first image comprises extracting the first set of tag features comprising a first infrared color from the first region of the first image, the first infrared color representing a first set of wavelengths in the infrared wavelength band;

wherein identifying the first animal identifier of the first animal, tagged with the first identification tag, based on the first set of tag features comprises identifying the first animal identifier of the first animal, tagged with the first identification tag, in response to matching the first infrared color to the target infrared color;

further comprising detecting the calibration card in the second image, the calibration card depicting a target visible color of the second animal identifier;

wherein extracting the second set of tag features from the second region of the second image comprises extracting the second set of tag features comprising a second visible color from the second region of the second image; and wherein identifying the second animal identifier of the second animal, tagged with the second identification tag, based on the second set of tag features comprises identifying the second animal identifier of the second animal, tagged with the second identification tag in response to matching the second visible color to the target visible color.

5. The method of claim 1:

wherein illuminating the interior volume of the animal cage with light outside of the visible light range comprises illuminating the interior volume of the animal cage with light within an infrared wavelength band;

wherein capturing the first image or the interior volume of the animal cage comprises capturing the first image or the interior volume of the animal cage, the first image comprising an infrared image;

wherein detecting the first identification tag in the first region of the first image comprises detecting the first identification tag in the first region of the first image, the first identification tag comprising a set of infrared-reflective regions;

wherein extracting the first set of tag features from the first region of the first image comprises extracting the first set of tag features from the first region of the first image, the first set of tag features representing the set of infrared-reflective regions; and wherein identifying the first animal identifier of the first animal based on the first set of tag features comprises identifying the first animal identifier of the first animal based on the first set of tag features representing the set of infrared-reflective regions.

6. The method of claim 1:

wherein capturing the first image of the interior volume of the animal cage comprises capturing the first image of the interior volume of the animal cage via an optical detector:
  mounted adjacent the animal cage; and
  defining a field of view facing the interior volume of the animal cage; and wherein capturing the second image of the interior volume of the animal cage comprises capturing the second image of the interior volume of the animal cage via the optical detector.

7. The method of claim 1, wherein interpreting the first animal position of the first animal occupying the animal cage based on the first pixel position of the first identification tag in the first region of the first image comprises:
  detecting a first set of two-dimensional pixel coordinates of a set of pixels representing the first identification tag in the first image;
  mapping the first set of two-dimensional pixel coordinates to a second set of two-dimensional cage coordinates in a coordinate system of the animal cage; and
  storing the second set of two-dimensional cage coordinates as the first animal position of the first animal at the first time.

8. The method of claim 1, wherein interpreting the first animal position of the first animal occupying the animal cage based on the first pixel position of the first identification tag in the first region of the first image comprises:
  detecting a first set of two-dimensional pixel coordinates of a set of pixels representing the first identification tag in the first image; and
  storing the first set of two-dimensional pixel coordinates as the first animal position of the first animal at the first time.

9. The method of claim 1, further comprising:
  detecting an absence of a third identification tag in the first image;
  accessing a third animal identifier of a third animal, tagged with the third identification tag; and
  appending the animal cage log with:
    the third animal identifier of the third animal;
    the first timestamp corresponding to the first time; and
    a flag indicating unknown location of the third animal.

10. The method of claim 1, further comprising:
  accessing a first sequence of animal positions of the first animal from the animal cage log, the first sequence of animal positions comprising the first animal position;
  deriving a first activity level of the first animal based on the first sequence of animal positions;
  accessing a second sequence of animal positions of the second animal from the animal cage log, the second sequence of animal positions comprising the second animal position;
  deriving a second activity level of the second animal based on the second sequence of animal positions; and
  setting a frame rate of the optical detector proportional to the first activity level of the first animal in response to the first activity level exceeding the second activity level.

11. The method of claim 10, further comprising:
  accessing a threshold activity level; and
  in response to the first activity level of the first animal exceeding the threshold activity level:
    generating a notification indicating the first activity level of the first animal exceeding the threshold activity level; and
    transmitting the notification to a user.

12. The method of claim 1, wherein identifying the first animal identifier of the first animal, tagged with the first identification tag, based on the first set of tag features comprises:
  characterizing a first difference between the first set of tag features detected in the first image and a first target set of tag features of the first identification tag;
  in response to the first difference falling below a threshold difference, matching the first set of tag features to the first target set of tag features; and
  identifying the first animal identifier associated with the first target set of tag features.

13. A method for animal identification and tracking comprises:
  during a dark cycle:
    illuminating an interior volume of an animal cage, occupied by a population of animals, with light outside of a visible light range via an optical emitter; and
    at a first time, capturing a first image of the interior volume of the animal cage;

detecting a first identification tag in a first region of the first image;

extracting a first set of tag features from the first region of the first image;

identifying a first animal identifier of a first animal, tagged with the first identification tag, based on the first set of tag features;

interpreting a first animal position of the first identification tag of the first animal occupying the animal cage based on a first pixel position of the first identification tag in the first image;

appending an animal cage log with:
　the first animal identifier of the first animal;
　a first timestamp corresponding to the first time; and
　the first animal position of the first animal;

during a light cycle:
　at a second time succeeding the first time, capturing a second image of the interior volume of the animal cage;

detecting the first identification tag in a second region of the second image;

extracting the first set of tag features from the second region of the second image;

identifying the first animal identifier of the first animal based on the first set of tag features;

interpreting a second animal position of the first animal based on a second pixel position of the first identification tag in the second image; and appending the animal cage log with:
　the first animal identifier of the first animal;
　a second timestamp corresponding to the second time; and
　the second animal position of the first animal.

14. The method of claim 13:

wherein detecting the first identification tag in the first region of the first image comprises detecting the first identification tag, affixed to a first ear of the first animal, in the first region of the first image;

further comprising:
　detecting a third identification tag in third region of the first image, the third identification tag affixed to a second ear of the first animal;
　extracting a third set of tag features from the third region of the first image;
　identifying the first animal identifier of the first animal, tagged with the third identification tag, based on the third set of tag features;
　detecting a third pixel position of the third identification tag in the first image;
　interpreting a first animal orientation of the first animal occupying the animal cage based on the first pixel position of the first identification tag and the third pixel position of the third identification tag in the first image; and
　appending the animal cage log with the first animal orientation of the first animal; and wherein interpreting the first animal position of the first animal occupying the animal cage based on the first pixel position of the first identification tag in the first image comprises interpreting the first animal position of the first animal occupying the animal cage based on and the third pixel position of the third identification tag in the first image.

15. The method of claim 13:

wherein extracting the first set of tag features from the first region of the first image comprises extracting the first set of tag features comprising a first infrared wavelength from the first region of the first image, the first infrared wavelength identifying the first animal; and wherein extracting the first set of tag features from the second region of the second image comprises extracting the first set of tag features comprising a second visible color from the second region of the second image, the second visible color identifying the first animal.

16. The method of claim 13:

wherein capturing the first image of the interior volume of the animal cage comprises capturing the first image of the interior volume of the animal cage via a first optical detector:
　mounted adjacent the animal cage; and
　defining a field of view facing the interior volume of the animal cage; and wherein capturing the second image of the interior volume of the animal cage comprises capturing the second image of the interior volume of the animal cage via a second optical detector:
　mounted adjacent the animal cage; and
　defining the field of view facing the interior volume of the animal cage.

17. The method of claim 13, wherein interpreting the first animal position of the first animal occupying the animal cage based on the first pixel position of the first identification tag in the first region of the first image comprises:

detecting a first set of two-dimensional pixel coordinates of a set of pixels representing the first identification tag in the first image;

mapping the first set of two-dimensional pixel coordinates to a second set of two-dimensional cage coordinates in a coordinate system of the animal cage; and storing the second set of two-dimensional cage coordinates as the first animal position of the first animal at the first time.

* * * * *